(12) United States Patent
Rapaka et al.

(10) Patent No.: US 9,948,949 B2
(45) Date of Patent: Apr. 17, 2018

(54) INTRA BLOCK COPY BLOCK VECTOR SIGNALING FOR VIDEO CODING

(71) Applicant: QUALCOMM Incorporated, San Diego, CA (US)

(72) Inventors: Krishnakanth Rapaka, San Diego, CA (US); Joel Sole Rojals, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 14/743,564

(22) Filed: Jun. 18, 2015

(65) Prior Publication Data

US 2015/0373370 A1    Dec. 24, 2015

Related U.S. Application Data

(60) Provisional application No. 62/015,313, filed on Jun. 20, 2014, provisional application No. 62/053,672, filed on Sep. 22, 2014, provisional application No. 62/056,965, filed on Sep. 29, 2014.

(51) Int. Cl.
*H04N 7/12* (2006.01)
*H04N 19/593* (2014.01)
*H04N 19/52* (2014.01)

(52) U.S. Cl.
CPC ........... *H04N 19/593* (2014.11); *H04N 19/52* (2014.11)

(58) Field of Classification Search
CPC ........... H04N 19/00951; H04N 19/107; H04N 19/593; H04N 19/61; H04N 19/82; H04N 19/86; H04N 19/96
See application file for complete search history.

(56) References Cited

U.S. PATENT DOCUMENTS

| | | | |
|---|---|---|---|
| 2013/0003849 A1* | 1/2013 | Chien | H04N 19/13 375/240.16 |
| 2015/0071357 A1 | 3/2015 | Pang et al. | |
| 2015/0264355 A1* | 9/2015 | Hsiang | H04N 19/517 375/240.02 |

(Continued)

FOREIGN PATENT DOCUMENTS

WO    2013139250 A1    9/2013

OTHER PUBLICATIONS

Second Written Opinion issued in International Application No. PCT/US2015/036718, dated Jun. 8, 2016, 4 pp.

(Continued)

*Primary Examiner* — Jessica M Prince

(57) ABSTRACT

This disclosure describes techniques for coding video data according to an intra Block Copy (BC) coding mode. A block vector difference that identifies a prediction block may be represented by a plurality of syntax elements, which may be encoded and decoded. This disclosure proposes various techniques whereby a video encoder may conditionally signal syntax elements representing the absolute value and/or sign of the components of the block vector difference. Likewise, a video decoder may be configured to infer the values of the syntax elements representing the absolute value and/or sign of the components of the block vector difference when such syntax elements are not signaled.

30 Claims, 9 Drawing Sheets

(56) References Cited

U.S. PATENT DOCUMENTS

2016/0227244 A1* 8/2016 Rosewarne .......... H04N 19/105

OTHER PUBLICATIONS

Response to Second Written Opinion dated Jun. 8, 2016, in International Application No. PCT/US2015/036718, filed Jul. 21, 2016, 4 pp.
International Preliminary Report on Patentability of International Application No. PCT/US2015/036718, dated Sep. 9, 2016, 10 pp.
Wiegand et al., "WD1: Working Draft 1 of High-Efficiency Video Coding," JCTVC-C403, 3rd Meeting: Guangzhou, CN, Oct. 7-15, 2010 (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011 (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011 (Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011 (Joint Collaborative Team on Video Coding of ISO/IEC JTC1/SC29/WG11 and ITU-T SG.16); JCTVC-7803_d2, Oct. 4, 2011, 226 pp.
Bross et al., "WD5: Working Draft 5 of High-Efficiency Video Coding," 7th Meeting: Geneva, CH, Nov. 21-30, 2011 (Joint Collaborative Team on Video Coding of ISO/IEC JTC1/SC29/WG11 and ITU-T SG.16); JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012 (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012 (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012 (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency Video Coding (HEVC) text specification draft 9," 11th Meeting: Shanghai, CN, Oct. 10-19, 2012 (Joint Collaborative Team on Video Coding of ISO/IEC JTC1/SC29/WG11 and ITU-T SG.16); JCTVC-K1003_v7, Nov. 2, 2012, 290 pp.
Bross et al., "High Efficiency Video Coding (HEVC) text specification draft 10 (for FDIS & Last Call)," 12th Meeting: Geneva, CH, Jan. 14-23, 2013 (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Pang et al., "Block vector prediction method for Intra block copy," JCT-VC Meeting; Mar. 27-Apr. 4, 2014; Valencia, ES (Joint Collaborative Team on Video Coding of ISO/IEC JTC1/SC29/WG11 and ITU-T SG.16); URL: http://wftp3.itu.int/av-arch/jctvc-site/, No. JCTVC-Q0114, Mar. 31, 2014, XP030116035, 3 pp.
Pang et al., "Non-RCE3: Block vector signaling for itra block copy," JCT-VC Meeting; Jan. 9-17, 2014; San Jose, CA, USA (Joint Collaborative Team on Video Coding of ISO/IEC JTC1/SC29/WG11 and ITU-T SG.16); URL: http://wftp3.itu.int/av-arch/jctvc-site/, No. JCTVC-P0149, Jan. 11, 2014, XP030115664, 7 pp.
Pang et al., "Non-RCE3: Intra Motion Compensation with 2-D MVs," JCT-VC Meeting; Jul. 25-Aug. 2, 2013; Vienna, AT (Joint Collaborative Team on Video Coding of ISO/IEC JTC1/SC29/WG11 and ITU-TSG 16 ); URL : http://wftp3.itu.int/av-arch/jctvc-site/, No. JCTVC-N0256, Aug. 2, 2013, XP030114777, 12 pp.
Rapaka et al., "Non-CE1 :Block vector coding for Intra block copy mode," JCT-VC Meeting; Oct. 17-24, 2014; Strasbourg, FR (Joint Collaborative Team on Video Coding of ISO/IEC JTC1/SC29/WG11 and ITU-T SG.16); URL: http://wftp3.itu.int/av-arch/jctvc-site/, No. JCTVC-S0143r1, Oct. 17, 2014, XP030116912, 5 pp.
Rapaka et al., "Non-SCCE1: On Intra block vector difference redundancy removal," JCT-VC Meeting; Jun. 30-Jul. 9, 2014; Sapporo, JP (Joint Collaborative Team on Video Coding of ISO/IEC JTC1/SC29/WG11 and ITU-T SG.16); URL: http://wftp3.itu.int/av-arch/jctvc-site/, No. JCTVC-R0182, Jun. 21, 2014, XP030116471, 3 pp.
Bross et al., "Editors' proposed corrections to HEVC version 1," JCT-VC Meeting; Apr. 18-26, 2013 (Joint Collaborative Team on Video Coding of ISO/IEC JTC1/SC29/WG11 and ITU-T SG.16); Document: JCTVC-M0432_v3, Apr. 25, 2013, 310 pp.
Pang et al., "Non-RCE3: Intra Motion Compensation with 2-D MVs," JCT-VC Meeting; Jul. 25-Aug. 2, 2013, Vienna, AT (Joint Collaborative Team on Video Coding of ISO/IEC JTC1/SC29/WG11 and ITU-T SG.16); Document: JCTVC-N0256, Jul. 27, 2013; 12 pp.
Lynn et al., "High Efficiency Video Coding (HEVC) Range Extensions text specification: Draft 6," JCT-VC Meeting; Jan. 9-17, 2014, San Jose, CA, USA (Joint Collaborative Team on Video Coding of ISO/IEC JTC1/SC29/WG11 and ITU-T SG.16); Document: JCTVC-P1005_v4, Apr. 3, 2014, 370 pp.
Lynn et al., "High Efficiency Video Coding (HEVC) Range Extensions text specification: Draft 7," JCT-VC Meeting; Mar. 27-Apr. 4, 2014; Valencia, ES (Joint Collaborative Team on Video Coding of ISO/IEC JTC1/SC29/WG11 and ITU-T SG.16); Document: JCTVC-Q1005_v4, Apr. 10, 2014, 376 pp.
Sole et al., "HEVC Screen Content Coding Core Experiment 1 (SCCE1): Intra Block Copying Extensions," JCT-VC Meeting; Mar. 27-Apr. 4, 2014; Valencia, ES (Joint Collaborative Team on Video Coding of ISO/IEC JTC1/SC29/WG11 and ITU-T SG.16); Document: JCTVC-Q1121, Apr. 18, 2014, 5 pp.
Joshi et al. "High Efficiency Video Coding (HEVC) Screen Content Coding: Draft 2," JCT-VC Meeting; Jun. 30-Jul. 3, 2014; Sapporo, JP (Joint Collaborative Team on Video Coding of ISO/IEC JTC1/SC29/WG11 and ITU-T SG.16); Document: JCTVC-S1005, Dec. 10, 2014; 374 pp.
Rapaka et al., "Non-CE3: Adaptive Pu partitioning for intra block copy," JCT-VC Meeting; Feb. 10-18, 2015; Geneva, CH (Joint Collaborative Team on Video Coding of ISO/IEC JTC1/SC29/WG11 and ITU-T SG.16); Document: JCTVC-T0091, Feb. 11, 2015, 3 pp.
Yu et al., "Requirements for future extensions of HEVC in coding screen content," ISO/IEC JTC1/SC29/WG11 MPEG2013/N14174, Jan. 2014, 5 pp.
Miyazawa et al., "Non-SCCE1: Adaptive switching between differential and direct coding for intra block copy vectors," JCT-VC Meeting; Jun. 30-Jul. 9, 2014; Sapporo, JP (Joint Collaborative Team on Video Coding of ISO/IEC JTC1/SC29/WG11 and ITU-T SG.16); Document: JCTVC-R0074_r3, Jul. 1, 2014; 52 pp.
Karczewicz et al., "Non-SCCE1: Block vector coding for Intra block copy," JCT-VC Meeting; Jun. 30-Jul. 9, 2014; Sapporo, JP

(56) References Cited

OTHER PUBLICATIONS (Joint Collaborative Team on Video Coding of ISO/IEC JTC1/SC29/WG11 and ITU-T SG.16); Document: JCTVC-R0181_v2, Jun. 27, 2014; 8 pp.
Pang et al., "Description of Core Experiment 1 (CE1): Vector entropy coding," JCT-VC Meeting; Jun. 30-Jul. 9, 2014; Sapporo, JP (Joint Collaborative Team on Video Coding of ISO/IEC JTC1/SC29/WG11 and ITU-T SG.16); Document: JCTVC-R1101, Aug. 9, 2014; 4 pp.
Wang et al., "High Efficiency Video Coding (HEVC) Defect Report 4," JCT-VC Meeting; Mar. 27-Apr. 4, 2014; Valencia, ES (Joint Collaborative Team on Video Coding of ISO/IEC JTC1/SC29/WG11 and ITU-T SG.16); Document: JCTVC-Q1003 (v.1), May 28, 2014; 314 pp.
Joshi et al., "Screen content coding test model 1 (SCM 1)," JCT-VC Meeting; Mar. 27-Apr. 4, 2014; Valencia, ES (Joint Collaborative Team on Video Coding of ISO/IEC JTC1/SC29/WG11 and ITU-T SG.16); Document: JCTVC-Q1014, Apr. 28, 2014, 5 pp.
International Search Report and Written Opinion from International Application No. PCT/US2015/036718, dated Oct. 20, 2015, 15 pp.
Yu et al., "Common conditions for screen content tests," JCT-VC Meeting; Mar. 27-Apr. 4, 2014; Valencia, ES (Joint Collaborative Team on Video Coding of ISO/IEC JTC1/SC29/WG11 and ITU-TSG.16); Document: JCTVC-Q1015, May 7, 2014; 5 pp.
Yu et al., "Common conditions for screen content coding tests," JCT-VC Meeting; Oct. 17-24, 2014; Strasbourg, FR (Joint Collaborative Team on Video Coding of ISO/IEC JTC1/SC29/WG11 and ITU-T SG.16); Document: JCTVC-S1015_11, Nov. 22, 2014, 6 pp.

\* cited by examiner

ILLUSTRATION OF INTRA BC

US 9,948,949 B2

INTRA BLOCK COPY BLOCK VECTOR SIGNALING FOR VIDEO CODING

This application claims the benefit of U.S. Provisional Patent Application No. 62/015,313, filed Jun. 20, 2014, U.S. Provisional Application No. 62/053,672, filed Sep. 22, 2014, and U.S. Provisional Application No. 62/056,965, filed Sep. 29, 2014, the entirety of each of which is incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra picture) prediction and/or temporal (inter picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra coded (I) slice of a picture are encoded using spatial prediction with respect to reference samples in neighboring blocks in the same picture. Video blocks in an inter coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter coded block is encoded according to a motion vector that points to a block of reference samples forming the predictive block, and the residual data indicating the difference between the coded block and the predictive block. An intra coded block is encoded according to an intra coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding video data according to an intra Block Copy (BC) coding mode. Intra BC refers to prediction techniques in which a current video block is coded based on a prediction block within the same picture. The prediction block within the same picture is identified by a vector, which may be referred to as a block vector difference. In some examples, a block vector difference that identifies a prediction block may be represented by a plurality of syntax elements, which may be encoded and decoded. This disclosure proposes various techniques whereby a video encoder may conditionally signal syntax elements representing the absolute value and/or sign of the components of the block vector difference. Likewise, a video decoder may be configured to infer the values of the syntax elements representing the absolute value and/or sign of the components of the block vector difference when such syntax elements are not signaled.

In one example of the disclosure, a method of decoding video data comprises receiving, in an encoded video bitstream, an encoded block of video data encoded using an intra BC mode, decoding a first absolute value of a first component of a block vector difference (BVD) associated with the encoded block of video data, decoding a second absolute value of a second component of the BVD associated with the encoded block of video data, decoding a first sign value for the first component of the BVD, inferring a second sign value for the second component of the BVD based on one or more video coding characteristics indicating that the second sign value is restricted to one value, determining the BVD based on the decoded first absolute value of the first component of the BVD, the decoded second absolute value of the second component of the BVD, the decoded first sign value for the first component of the BVD, and the inferred second sign value for the second component of the BVD, determining a block vector from the BVD and a block vector predictor, and decoding the block of video data using the block vector. In this example, the first component of the BVD may either by the horizontal component of the BVD or the vertical component of the BVD.

In another example, of the disclosure, decoding the first absolute value of the first component of the BVD comprises receiving a first syntax element associated with the first absolute value of the first component of the BVD, inferring that a value of the first syntax element represents the first absolute value of the first component of the BVD minus an offset based on the one or more video coding characteristics indicating that the first absolute value of the first component is greater than the offset, and determining the first absolute value of the first component by adding the value of the first syntax element to the offset.

In another example of the disclosure, an apparatus configured to decode video data comprises a memory configured to store video data, and a video decoder configured to receive, in an encoded video bitstream, an encoded block of the video data encoded using an intra BC mode, decode a first absolute value of a first component of a BVD associated with the encoded block of video data, decode a second absolute value of a second component of the BVD associated with the encoded block of video data, decode a first sign value for the first component of the BVD, infer a second sign value for the second component of the BVD based on one or more video coding characteristics indicating that the second sign value is restricted to one value, determine the BVD based on the decoded first absolute value of the first component of the BVD, the decoded second absolute value of the second component of the BVD, the decoded first sign value for the first component of the BVD, and the inferred second sign value for the second component of the BVD, determine a block vector from the BVD and a block vector predictor, and decode the block of video data using the block vector.

In another example of the disclosure, an apparatus configured to decode video data comprises means for receiving, in an encoded video bitstream, an encoded block of video data encoded using an intra BC mode, means for decoding a first absolute value of a first component of a BVD associated with the encoded block of video data, means for decoding a second absolute value of a second component of the BVD associated with the encoded block of video data, means for decoding a first sign value for the first component of the BVD, means for inferring a second sign value for the second component of the BVD based on one or more video coding characteristics indicating that the second sign value is restricted to one value, means for determining the BVD based on the decoded first absolute value of the first component of the BVD, the decoded second absolute value of the second component of the BVD, the decoded first sign value for the first component of the BVD, and the inferred second sign value for the second component of the BVD, means for determining a block vector from the BVD and a block vector predictor, and means for decoding the block of video data using the block vector.

In another example of the disclosure, a method of encoding video data comprises encoding a first absolute value of a first component of a BVD associated with a block of video data encoded with intra BC mode, encoding a second absolute value of a second component of the BVD associated with the block of video data, encoding a first sign value for the first component of the BVD, not encoding a second sign value for the second component of the BVD based on one or more video coding characteristics indicating that the second sign value is restricted to one value, and generating syntax elements for the first absolute value, the second absolute value, and the first sign value.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure proposes various methods, techniques, and apparatuses for intra Block Copy (BC) block vector coding. In various examples of the disclosure, the techniques described herein improve intra BC block vector coding by removing redundancies and improving other aspects of intra BC block vector coding. The techniques of this disclosure may be used in any video coding process that utilizes an intra BC mode, including extensions of the high efficiency video coding (HEVC) standard (e.g. screen content coding extensions). Certain examples of this disclosure may also be applicable to HEVC and its extensions, in general, including the support for higher bit depths (e.g., more than 8 bits), as well as support for higher chroma sampling formats (e.g., 4:4:4 and 4:2:2 chroma sub-sampling formats).

Figure 1:
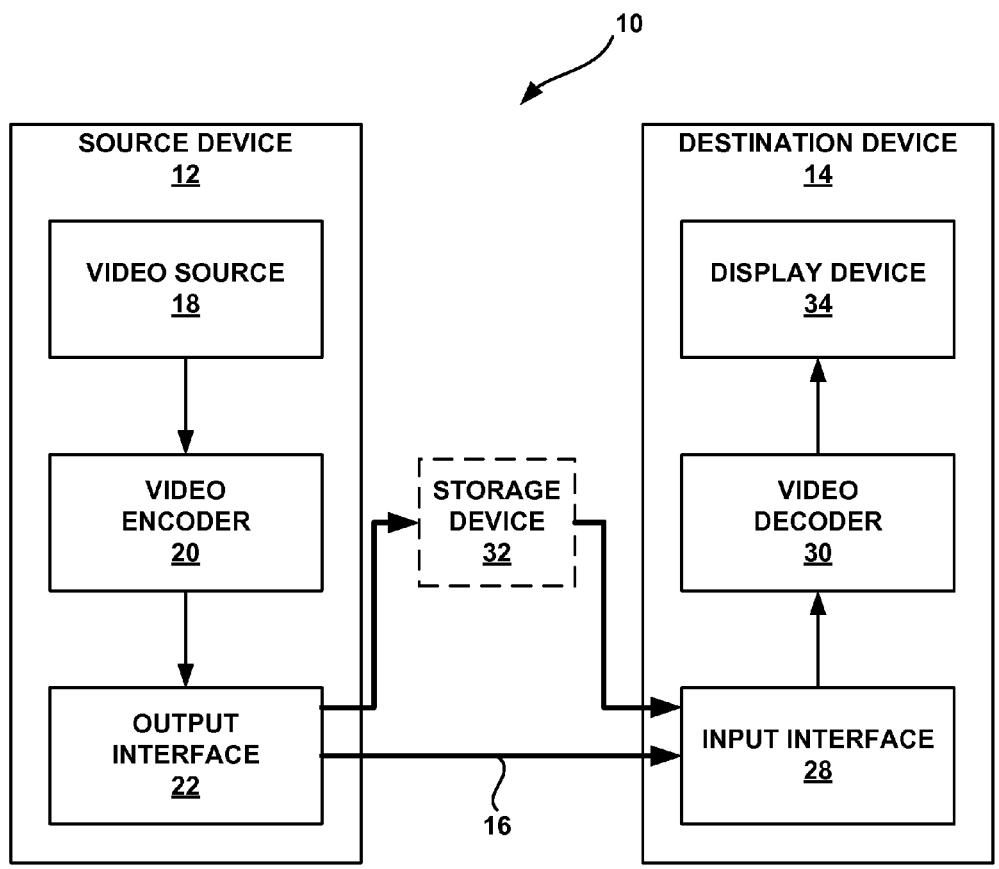
FIG. 1 is a block diagram illustrating an example video encoding and decoding system that may utilize the techniques described in this disclosure.

FIG. 1 is a block diagram illustrating an example video encoding and decoding system 10 that may utilize the techniques for intra BC block vector coding described in this disclosure. As shown in FIG. 1, system 10 includes a source device 12 that generates encoded video data to be decoded at a later time by a destination device 14. Source device 12 and destination device 14 may comprise any of a wide range of devices, including wireless communication devices, cellular telephones (communicating via a cellular communication standard), desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated and demodulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure for intra BC block vector coding are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 34. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As will be discussed in more detail below, video encoder 20 and video decoder 30 may be configured to execute the techniques of the disclosure for conditionally signaling and/or inferring aspects of a block vector difference in intra BC video coding. In one example of the disclosure, video decoder 30 may be configured to receive, in an encoded video bitstream, an encoded block of video data encoded using an intra Block Copy (BC) mode. Video decoder 30 may decode a first absolute value of a first component of a block vector difference (BVD) associated with the encoded block of video data, decode a second absolute value of a second component of the associated with the encoded block of video data, and decode a first sign value for the first component of the BVD. Video decoder 30 may be further configured to infer a second sign value for the second component of the BVD based on one or more video coding characteristics indicating that the second sign value is restricted to one value. Video decoder 30 may also be configured to determine the BVD based on the decoded first absolute value of the first component of the BVD, the decoded second absolute value of the second component of the BVD, the decoded first sign value for the first component of the BVD, and the inferred second sign value for the second component of the BVD. Video decoder 30 may be further configured to determine a block vector from the BVD and a block vector predictor, and decode the block of video data using the block vector.

In another example of the disclosure, video encoder 20 may be configured to encode a first absolute value of a first component of a BVD associated with a block of video data encoded with intra BC mode, encode a second absolute value of a second component of the associated with the block of video data, and encode a first sign value for the first component of the BVD. Video encoder 20 may be further configured to not encode a second sign value for the second component of the BVD based on one or more video coding characteristics indicating that the second sign value is restricted to one value. Video encoder 20 may also be configured to generate syntax elements for the first absolute value, the second absolute value, and the first sign value.

The JCT-VC has developed the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra prediction encoding modes, the HM may provide as many as thirty-three intra prediction encoding modes.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Sep. 22, 2014 is downloadable from: http://phenix.int-evry.fr/jct/doc_end_user/documents/12_Geneva/wg11/JCTVC-L1003-v34.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13$^{th}$ Meeting, Incheon, KR, April 2013, which as of Aug. 30, 2013, is available from: http://phenix.int-evry.fr/jct/doc_end_user/documents/13_Incheon/wg11/JCTVC-M0432-v3.zip.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ based on whether the CU is skip or direct mode encoded, intra prediction mode encoded, or inter prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as TUs. Pixel difference values associated with the TUs may be transformed to produce transform coefficients, which may be quantized.

In general, a PU includes data related to the prediction process. For example, when the PU is intra mode encoded, the PU may include data describing an intra prediction mode for the PU. As another example, when the PU is inter mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A given CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra prediction in PU sizes of 2N×2N or N×N, and inter prediction in symmetric PU sizes of 2N×2N, 2N×N, N×2N, or N×N. The HM also supports asymmetric partitioning for inter prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra predictive or inter predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

As described above, prediction techniques for a block of video data are generally categorized as intra prediction and inter-prediction. Intra prediction, or spatial prediction, generally involves predicting the block from pixel values of neighboring, previously coded blocks in the same picture. Inter-prediction, or temporal prediction, generally involves predicting the block from pixel values of one or more previously coded pictures.

Many applications, such as remote desktop, remote gaming, wireless displays, automotive infotainment, cloud computing, etc., are becoming routine in daily lives. Video contents (i.e., screen content) in these applications are usually combinations of natural content, text, artificial graphics, etc. In text and artificial graphics region, repeated patterns (such as characters, icons, symbols, etc.) often exist.

Recently, investigation of new coding tools for screen content material, such as text and graphics with motion, was requested. In response, various techniques and technologies that improve the coding efficiency for screen content have been proposed. Because there is evidence that significant improvements in coding efficiency can be obtained by exploiting the characteristics of screen content with novel dedicated coding tools, a Call for Proposals (CfP) is being issued with the target of possibly developing future extensions of the HEVC standard including specific tools for screen content coding. Organizations are invited to submit proposals in response to this Call. The use cases and requirements of this CfP are described in MPEG document N14174. During the 17$^{th}$ JCT-VC meeting, screen content coding test model (SCM) is established, which is available at http://phenix.int-evry.fr/jct/doc_end_user/documents/17_Valencia/wg11/JCTVC-Q1014-v1.zip.

Intra BC is a technique which may enable a video coder to remove redundancy and improve intra-picture coding efficiency for screen content. In some instances, Intra BC alternatively may be referred to as intra motion compensation (MC). More details concerning intra BC techniques can be found in C. Pang, et al., "Non-RCE3 Intra Motion Compensation with 2-D MVs," Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, (hereinafter, "JCTVC-N0256"). JCTVC-N0256 is available for download at http://phenix.int-evry.fr/jct/doc_end_user/documents/14_Vienna/wg11/JCTVC-N0256-v4.zip.

Proposals for intra BC techniques were recently adopted for inclusion in the (HEVC) Range Extensions standard. A draft of the HEVC Range Extensions is described in D. Flynn, et al., "High Efficiency Video Coding (HEVC) Range Extensions text specification: Draft 7," Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, JCTVC-Q1005_v1 (hereinafter, "HEVC Range Extension"). HEVC Range extension is available for download at http://phenix.int-evry.fr/jct/doc_end_user/documents/17_Valencia/wg11/JCTVC-Q1005-v4.zip.

In this document, the HEVC specification text (e.g., HEVC WD10) may be referred to as HEVC version 1. The range extension specification may become version 2 of the HEVC. However, to a large extent, many of the proposed techniques in HEVC version 1 (e.g., motion vector prediction) are technically similar in the HEVC range extension. Therefore, whenever this disclosure refers to the changes based on HEVC version 1, the same changes may apply to the range extension specification. Similarly, when this disclosure reuses an HEVC version 1 module and/or specification section, the same HEVC range extension module and/or specification section (with the same sub-clauses) is also reused.

Figure 2:
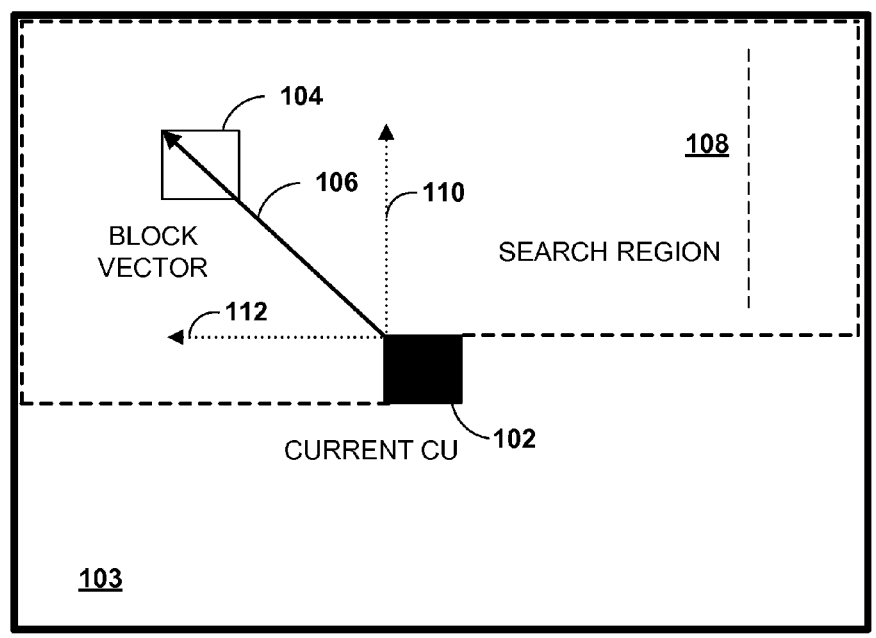
FIG. 2 is a conceptual diagram illustrating example intra block copy (BC) techniques.
Figure 5:
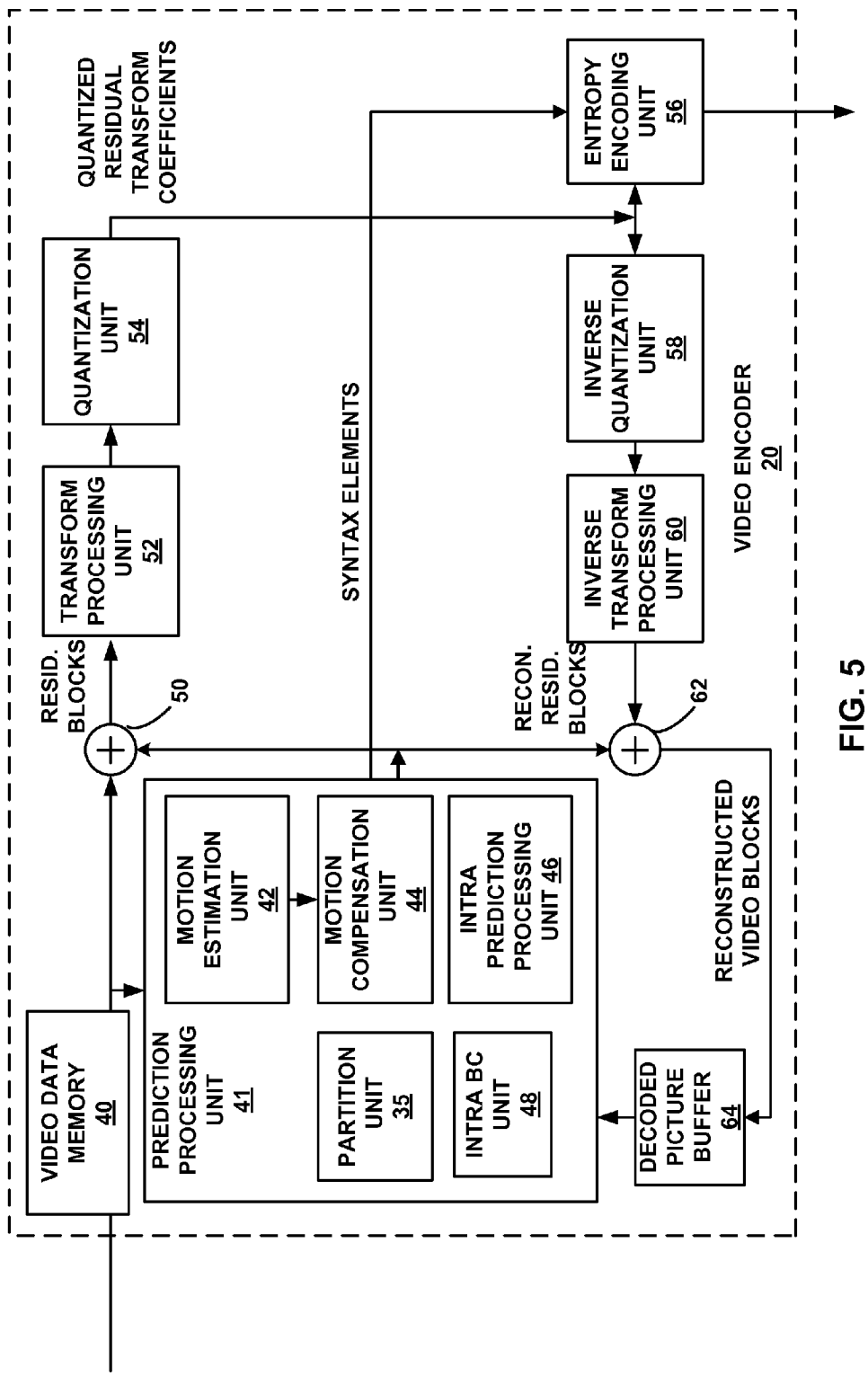
FIG. 5 is a block diagram illustrating an example video encoder that may implement the techniques described in this disclosure.
Figure 6:
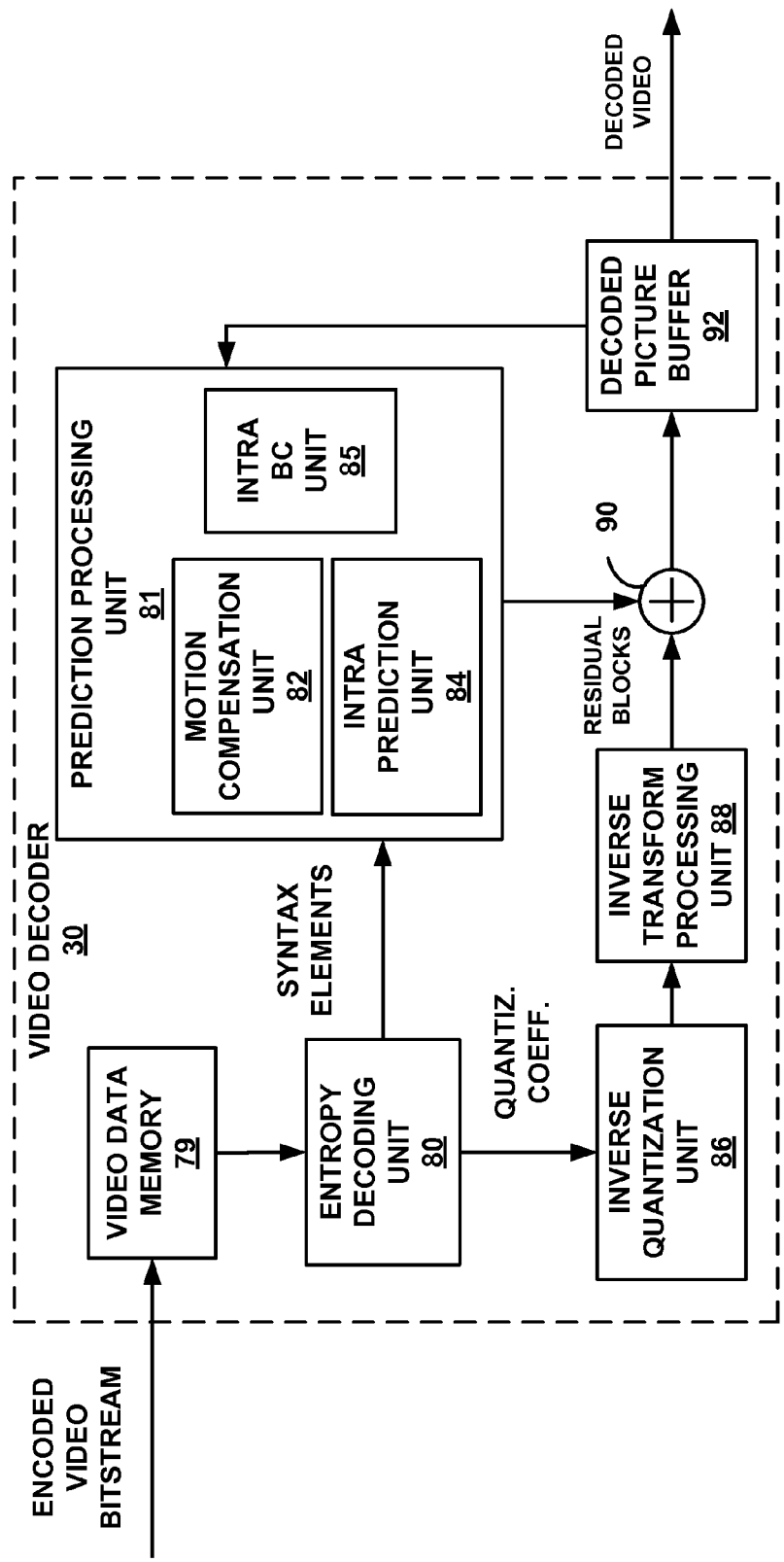
FIG. 6 is a block diagram illustrating an example video decoder that may implement the techniques described in this disclosure.

The intra BC coding mode enables spatial prediction from non-neighboring samples, but within the current picture. This is illustrated in FIG. 2, which will be described in more detail below. In the intra BC coding mode, a current block is predicted from an already decoded block (before in-loop filtering) of the current picture. The term in-loop filtering may include both an in-loop de-blocking filter, as well as a sample adaptive offset (SAO). In other examples, additional in-loop filters may be used, including an adaptive loop filter (ALF). With reference to FIG. 5, in-loop filtering would occur between summer 62 and decoded picture buffer 64. With reference to FIG. 6, in-loop filtering would occur between summer 90 and decoded picture buffer 92. In the decoder the predicted values are added to the residues without any interpolation (e.g., a block vector (BV) is signalled as an integer value). After block vector prediction, the block vector difference may be encoded using the motion vector difference coding method in HEVC.

One example intra BC coding mode may be enabled at both CU and PU level. In one example, for PU level intra BC coding, 2N×N and N×2N PU partition are supported for all the CU sizes. In addition, when the CU is the smallest CU, N×N PU partition is supported. The intra BC coding techniques were recently removed from the HEVC range extensions. However, the related techniques have become the basis for screen content coding (SCC). A recent draft of the HEVC SCC Extension is described in Rajan Joshi et al., "High Efficiency Video Coding (HEVC) Screen Content Coding: Draft 2," JCTVC-S1005, Sapporo, JP, 30 Jun.-9 Jul. 2014 (hereinafter "SCC"). A copy of SCC is available at http://phenix.int-evry.fr/jct/doc_end_user/documents/19_Strasbourg/wg11/JCTVC-S1005-1/1.zip, as of May 21, 2015.

FIG. 2 is a conceptual diagram illustrating an example technique for predicting a current video block 102 within a current picture 103 according to an intra BC mode. FIG. 2 illustrates a predictive video block 104 within current picture 103. A video coder, e.g., video encoder 20 and/or video decoder 30, may use predictive video block 104 to predict current video block 102 according to an intra BC mode in accordance with the techniques of this disclosure.

Video encoder 20 determines a predictive video block 104 for predicting current video block 102 from a set of previously reconstructed blocks of video data. That is, predictive video block 104 is determined from among the blocks of video data that were already encoded and reconstructed in the same frame as current video block 102. Video encoder 20 reconstructs blocks of video data by inverse quantizing and inverse transforming the video data that is also included in the encoded video bitstream, and summing the resulting residual blocks with the predictive blocks used to predict the reconstructed blocks of video data.

In the example of FIG. 2, search region 108 within current picture 103, which may also be referred to as an "intended area," "search area," or "raster area," includes a set of previously reconstructed video blocks. Video encoder 20 may determine predictive video block 104 used to predict current video block 102 from among the video blocks in search region 108 based on an analysis of the relative efficiency and accuracy of predicting and coding current video block 102 based on various video blocks within search region 108.

Video encoder 20 determines a two-dimensional block vector 106 (also called an offset vector, displacement vector, or motion vector) representing the location or displacement of predictive video block 104 relative to current video block 102. In some examples, block vector 106 is calculated from the position of the upper left pixel of predictive video block 104 and the position of the upper left pixel of current video block 102. However, block vector 106 may be calculated relative to any predefined or signaled position within predictive video block 104 and current video block 102.

Block vector 106 is a two-dimensional vector that includes a horizontal displacement component 112 (i.e., an x-component) and a vertical displacement component 110 (i.e., a y-component), which respectively represent the horizontal and vertical displacement of predictive video block 104 relative to current video block 102. Video encoder 20 may include one or more syntax elements that identify or define block vector 106, e.g., that define horizontal displacement component 112 and vertical displacement component 110, in the encoded video bitstream. Video decoder 30 may decode the one or more syntax elements to determine the horizontal and vertical displacement components of block vector 106, and use the determined block vector to identify predictive video block 104 for current video block 102.

Current video block 102 may be a CU, or a PU of a CU. In some examples, a video coder, e.g., video encoder 20 and/or video decoder 30, may split a CU that is predicted according to intra BC into a number of PUs. In such examples, the video coder may determine a respective (e.g., different) BVD for each of the PUs of the CU. For example, a video coder may split a 2N×2N CU into two 2N×N PUs, two N×2N PUs, or four N×N PUs. As other examples, a video coder may split a 2N×2N CU into ((N/2)×N+(3N/2)×N) PUs, ((3N/2)×N+(N/2)×N) PUs, (N×(N/2)+N×(3N/2)) PUs, (N×(3N/2)+N×(N/2)) PUs, four (N/2)×2N PUs, or four 2N×(N/2) PUs. In some examples, video coder may predict a 2N×2N CU using a 2N×2N PU.

As shown in FIG. 2, it may be observed that predictive video block 104 can only be inside the already decoded region (i.e., search region 108) and cannot fall outside this region. In some proposals for the SCC, rather than coding the entirety of block vector 106, a block vector difference (BVD) is coded in the bitstream. The BVD is the block vector minus a block vector predictor (BVP). There have been various proposals related to BVP prediction methods, and a core experiment was setup to study such methods (the document Sole, et al. "HEVC Screen Content Coding Core Experiment 1 (SCCE1): Intra Block Copying Extensions," Joint Collaborative Team on Video Coding (JCT-VC) of ITU-T SG 16 WP 3 and ISO/IEC JTC 1/SC 29/WG 11, 17th Meeting: Valencia, ES, 27 Mar.-4 Apr. 2014, JCTVC-Q1121 details some methods).

If the predictor of the current block is known while parsing, valid and invalid BVDs can be derived and such information can be used to optimize BVD coding. Motivated by this observation, systems and methods to improve BVD coding are disclosed. Various aspects on intra BC coding are disclosed herein. Each of the examples described below may be applied jointly or separately with other examples.

Figure 3:
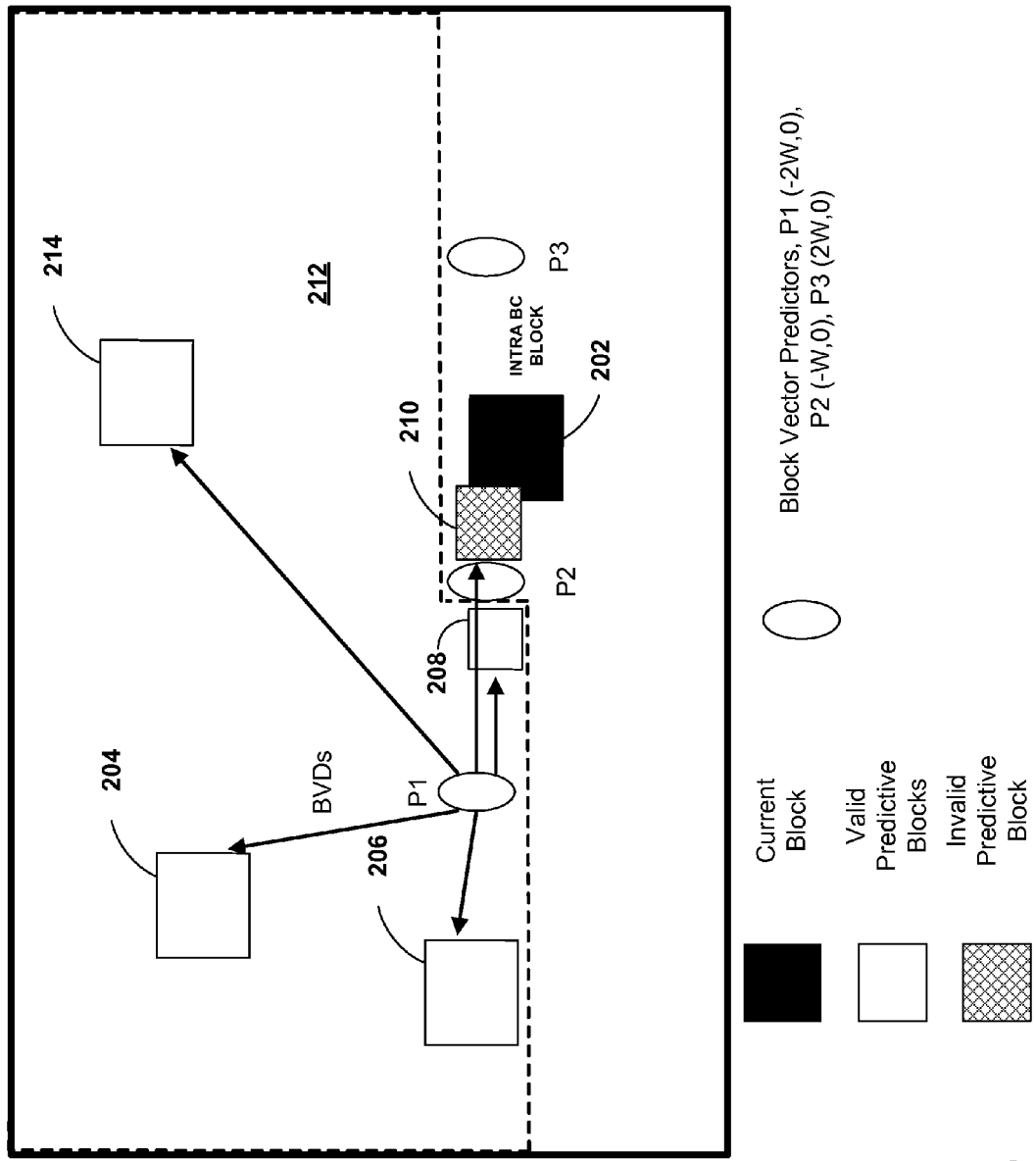
FIG. 3 is a conceptual diagram showing an example of block vector difference (BVD) coding in accordance with examples of this disclosure.

FIG. 3 is a conceptual diagram showing an example of BVD coding in accordance with examples of this disclosure. For current block 202, predictive blocks 204, 206, 208, and 214 are potential valid predictive blocks that may be used to code current block 202, and may be used to generate valid BVDs. Block 210 is not within search region 212, and as such may not be used as a predictive block (i.e., is an invalid predictive block, or be used to generate a BVD from any BVP. Again, a BVD is a defined as a block vector (i.e., the vector from the current block to a predictive block) minus the BVP (e.g., defaults predictors P1-P3 in FIG. 3). Like a block vector, a BVD may be comprised of both an x component (BVDx) and a y component (BVDy).

BVPs P1, P2, and P3 are default BVPs used to decrease the size of the block vector that is signaled. Video encoder 20 may calculate the BVD relative to a BVP, rather than relative to the current block 202. Video encoder 20 may determine one of BVPs P1, P2, or P3 to use to calculate the BVD based on a predetermined rate-distortion criteria. In some examples, video encode 20 may be configured to select the BVP that produces the smallest BVD in bits. Video encoder 20 may be configured to signal a syntax element indicating the BVP used to generate the BVD. Video decoder 30 is configured to decode the BVD and then add the value of the BVP to the decoded BVD to obtain the block vector for current block 202.

In the example of FIG. 3, BVPs P1, P2, and P3 are defined relative to the width (W) in pixels of current block 202. In the example of FIG. 3, current block 202 is a PU and width W is the width of the PU. BVP P1 is at position (−2W, 0). That is, BVP P1 is two times the width of current block 202 to left of the upper left corner pixel of current block 202. However, the positions of the BVPs may be defined relative to any point in current block 202. BVP P2 is one times the width of current block 202 to the left of the upper left corner pixel of current block 202. BVP P3 is one times the width of current block 202 to the right of the upper left corner pixel of current block 202.

Figure 4:
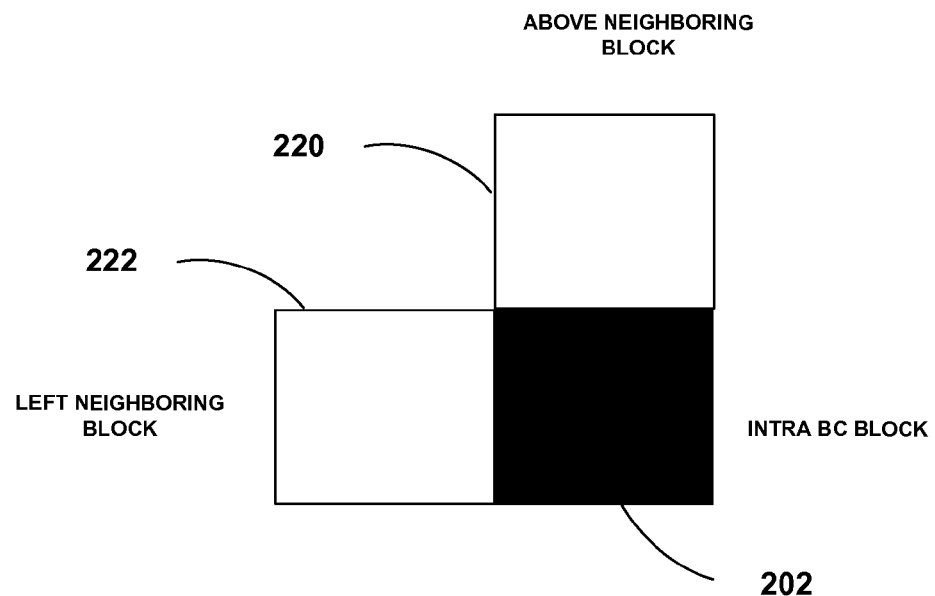
FIG. 4 is a conceptual diagram showing other example block vector predictors for BVD coding in accordance with examples of this disclosure.

BVPs P1, P2, and P3 are only examples of potential BVPs. Another BVP may be defined at position (W, 0) away from current block 202. In some intra BC prediction modes, two default BVPs are used (e.g., (−2W, 0) and (−W, 0) or (−2W, 0) and (2W, 0). In other examples of the disclosure, a position within a neighboring block (e.g., the upper left corner of a neighboring block) may be used as a BVP. FIG. 4 shows an example of where left neighboring block 222 and above neighboring block 220, relative to current block 202, may be used as BVPs. In other examples, neighboring blocks at other positions relative to current block 202 may be used as BVPs. In some examples of intra BC coding, left neighboring block 222 and/or above neighboring block 220 may be used as a BVP if the neighboring blocks themselves are also coded using intra BC mode.

Returning to FIG. 3, for BVP P1, when the BVDx component (is greater than W (i.e., BVDx is greater than W pixels to the right of BVP P1), where W is width of current block 202, in order for the predictive block used to generate the BVD to not fall in the non-decoded region, BVDy has to be positive. For example, a BVD calculated from predictive block 214 would have a BVDx component greater than W if calculated from BVP P1. Additionally, in the example where the BVDx component from BVP P1 is greater than W, the BVDy component must be greater than height of current block 202 to be in search region 212. This is because the entirety of any predictive block for current block 202 must be within search region 212, as such, the BVDy component for a positive BVDx component greater than W must be at least one height in pixels higher than current block 202. The same results apply for BVPs P2 and P3 when a BVDx component calculated from BVPs P2 or P3 is greater than zero.

In view of these examples, this disclosure proposes techniques whereby video encoder 20 may be configured to not signal (e.g., conditionally signal) one or more of a sign or portion (e.g., BVD minus an offset) of a component of a BVD under certain conditions and/or given certain characteristics of the intra BC video coding process. Given the same conditions and/or characteristics of the intra BC video coding process whereby video encoder 20 would be configured to not signal a sign or portion of a component of a BVD, video decoder 30 would be configured to infer the value of the sign or portion of a component of the BVD based on some predefined rules. The ability to infer parts of a BVD vector, such as sign or BVD minus an offset, is unique due to the geometry characteristics of intra BC implementations. That is, in intra BC coding, prediction is performed relative to the decoded samples within the current picture contrary to a temporal picture that is already fully decoded in the case of motion vector decoding for inter-prediction.

Below is a list of certain examples of the disclosure, each of which may be applied in combination with other examples of the disclosure, or may be used separately. In the examples below, from the standpoint of video encoder 20, conditional signaling comprises determining whether or not to signal a particular syntax element representative of a BVD component value (e.g., sign of a BVD component or BVD minus an offset) based on one or more video coding characteristics. Likewise, from the standpoint of video decoder 30, when a particular syntax element representative of a BVD component value (e.g., sign of a BVD component or BVD minus an offset) is not signaled, video decoder 30 may be configured to infer the value of the syntax element based on the one or more video coding characteristics. Example video coding characteristics are detailed below, and may include one or more of the sign value of the x component of a BVD, the sign value of the y component of a BVD, the use of default predictors (e.g., BVPs P1, P2, and P3 of FIG. 3), a value of the BVP, a position of the BVP, an availability of a neighboring block of the currently encoded block, a coding mode of the neighboring block, and/or an intra BC merge index.

In one example of the disclosure, video encoder 20 may be configured to conditionally signal the sign value of a component of a BVD based on one or more video coding characteristics. Likewise, video decoder 30 may be configured to infer the sign value for a component of a BVD based on one or more video coding characteristics. In general, video encoder 20 may be configured to not signal the sign value of a BVD component, and video decoder 30 may be configured to infer the sign value of a BVD component, in the situation where the video coding characteristics are such that only one sign value is possible for a particular component of the BVD.

In one example of the disclosure, video encoder 20 may be configured to conditionally signal the sign value of a component of a BVD based on the value and/or sign of the other component of the BVD. That is, video encoder 20 may be configured to conditionally signal the sign of BVDy based on the value and sign of BVDx or vice versa. In particular, video encoder 20 may be configured to not signal the sign value of a first component of a BVD when the other component of the BVD is such that the first component of the BVD must always have a specific value.

For example, with reference to FIG. 3, if the BVP is P2 and BVDx is positive (i.e., the predictive block is to the right of P2), BVDy is necessarily also positive because the predictive block must be in search region 212. As such, in this example, video encoder 20 may be configured to not signal the sign of BVDy. Likewise, in this situation, video decoder 30 may be configured to infer the sign value of BVDy to be positive.

In another example of the disclosure, video encoder 20 may be configured to conditionally signal the sign value of a component of a BVD based on whether default BVPs are used for intra BC coding. For example, default BVPs P1, P2, and P3 may be defined as shown in FIG. 3. For certain locations of current block 202, one default BVP may be defined as having an x value as the right-most pixel of the picture. As such, if such a defaults BVP were used, BVDx is necessarily always negative, and video encoder 20 may be configured to not signal the sign of BVDx. Similarly, a default BVP may be defined as being the left-most pixel of picture. As such, if a BVP positioned at the left-most pixel of the picture were used, BVDx would necessarily always be positive, and video encoder 20 may be configured to not signal the sign of BVDx.

In another example of the disclosure, video encoder 20 may be configured to conditionally signal the sign value of a component of a BVD based on the availability of neighboring blocks and/or the prediction mode of neighboring blocks (e.g., left neighboring block 222 and/or above neighboring block 220 of FIG. 4). In some examples, neighboring blocks may be used as a BVP. In such a case, video encoder 20 may signal the sign values of the BVD components (i.e., not inferred by video decoder 30), as the neighboring block used as the BVP may not be known at video decoder 30. If neighboring blocks are not available to be used as a BVP, sign values may be hidden according to other video coding characteristics, including any of the characteristics discussed above.

In another example of the disclosure, video encoder 20 may be configured to conditionally signal the sign value of a component of a BVD based on the BVP value, the position of the BVP, or an intra BC merge index. In general, in response any video coding characteristic that would cause the sign value of a component of BVD to be restricted to a single value (i.e., always negative or always positive), video encoder 20 may be configured to not signal the sign value. Likewise, based on the same video coding characteristic, video decoder 30 may be configured to infer the sign value of a component of the BVD. In this way, unnecessary signaling of sign values is avoided, thus increasing bit rate efficiency.

Based on the same reasoning discussed above, rather than signaling the entire absolute value of a component of the BVD, video encoder 20 may be configured to conditionally signal the BVD minus a predetermined offset in situations where a component of the BVD is necessarily greater than a height or width of the current block. As discussed above, given the requirement that the predictive block be within search region 212, in some situations a component of the BVD will necessarily be greater than the width of height of current block 202. For example, referring back to FIG. 3, if the BVDx component relative to BVP P1 is greater than W, the BVDy component must be greater than height of current block 202 to be in search region 212. In this situation rather that signaling the entirety of BVDy, video encoder 20 may be configured to signal BVDy minus an offset. The offset may be the height of current block 202 or a function of the height of current block 202 (e.g., the height plus some constant). Video decoder 30 may be configured to add the offset back to value of the BVDy component received in the encoded bitstream to recover the actual value of the BVDy component.

Like the examples of above for sign hiding, any combination of video coding characteristics that indicate that a particular component of the BVD is greater than the offset in order for the predictive block to be within search region 212 may be used to determine when the component of the BVD is conditionally signaled as BVD minus the offset. Again, example video coding characteristics may include one or more of the sign value of the x component of a BVD, the sign value of the y component of a BVD, the use of default predictors (e.g., BVPs P1, P2, and P3 of FIG. 3), a value of the BVP, a position of the BVP, an availability of a neighboring block of the currently encoded block, a coding mode of the neighboring block, and/or an intra BC merge index.

In summary, in accordance with the techniques of this disclosure, video decoder 30 may be configured to receive, in an encoded video bitstream, an encoded block of the video data encoded using an intra BC mode. Video decoder 30 may be configured to also receive one or more syntax elements that are indicative of a first absolute value of a first component of a BVD and receive one or more syntax elements that are indicative of a second absolute value of a second component of a BVD. Video decoder 30 may be configured to decode the first absolute value of the first component of the BVD associated with the encoded block of video data and decode a second absolute value of the second component of the associated with the encoded block of video data.

Video decoder 30 may be further configured to receive a syntax element indicative of a first sign value for the first component of the BVD and decode the first sign value for the first component of the BVD. In accordance with the techniques of this disclosure, video decoder 30 may be configured to infer a second sign value for the second component of the BVD based on one or more video coding characteristics indicating that the second sign value is restricted to one value. That is, rather than receiving a syntax value for the sign value of the second component of the BVD (i.e., video encoder 20 does not encode a syntax element indicating the sign value of the second component), video decoder 30 infers the sign value of the second component.

Video decoder 30 may be further configured to determine the BVD based on the decoded first absolute value of the first component of the BVD, the decoded second absolute value of the second component of the BVD, the decoded first sign value for the first component of the BVD, and the inferred second sign value for the second component of the BVD. Video decoder 30 may then determine a block vector from the BVD and a block vector predictor, and decode the block of video data using the block vector.

In the examples above, the one or more video coding characteristics may include one or more of the first sign value of the first component of the BVD, use of default block vector predictors, a value of the block vector predictor, a position of the block vector predictor, an availability of a neighboring block to the encoded block, a coding mode of the neighboring block, or an intra BC merge index.

In one example, the first component of the BVD is the x component of the BVD, and the second component of the BVD is the y component of the BVD. In another example, the first component of the BVD is the y component of the BVD, and the second component of the BVD is the x component of the BVD.

In another example of the disclosure, to decode the first absolute value of the first component of the BVD, video decoder 30 is configured to receive a first syntax element associated with the first absolute value of the first component of the BVD, and infer that a value of the first syntax element represents the first absolute value of the first component of the BVD minus an offset based on the one or more video coding characteristics indicating that the first absolute value of the first component is greater than the offset. Video decoder 30 may determine the first absolute value of the first component by adding the value of the first syntax element to the offset. In one example, the offset is one of a width of the encoded block of video data or a height of the encoded block of video data. In another example, the offset is a function of a width of the encoded block of video data or a function of a height of the encoded block of video data.

The following is a proposed example implementation of the techniques of this disclosure. The following example is based on HEVC, as well as proposed block vector prediction methods and default BVPs based on the neighboring blocks modes proposed (such as the neighboring block modes proposed in JCTVC-Q1121).

TABLE 1

| IntraBC Block vector difference syntax | |
|---|---|
| intra_bc_bvd_coding ( x0, y0, refList ) { | Descriptor |
|     intra_bc_abs_bvd_greater0_flag[ 0 ] | ae(v) |
|     intra_bc_abs_bvd_greater0_flag[ 1 ] | ae(v) |
|     if(intra_bc_abs_bvd_greater0_flag[ 0 ] ) | |
|         intra_bc_abs_bvd_greater1_flag[ 0 ] | ae(v) |
|     if(intra_bc_abs_bvd_greater0_flag[ 1 ] ) | |
|         intra_bc_abs_bvd_greater1_flag[ 1 ] | ae(v) |
|     if(intra_bc_abs_bvd_greater0_flag[ 0 ] ) { | |
|         if(intra_bc_abs_bvd_greater1_flag[ 0 ] ) | |
|             intra_bc_abs_bvd_minus2[ 0 ] | ae(v) |
|         intra_bc_bvd_sign_flag[ 0 ] | ae(v) |
|     } | |
|     if(intra_bc_abs_bvd_greater0_flag[ 1 ] ) { | |
|         if(intra_bc_abs_bvd_greater1_flag[ 1 ] ) | |
|             intra_bc_abs_bvd_minus2[ 1 ] | ae(v) |
|         if(!HideSign) | |
|             intra_bc_bvd_sign_flag[ 1 ] | ae(v) |
|     } | |
| } | |

The following semantics describe example definitions for some of the syntax elements listed in the above syntax tables.

The value of intra_bc_abs_bvd_greater0_flag[compIdx] may specify whether the absolute value of a block vector component difference is greater than 0. The value of compIdx indicates whether the syntax element relates to the x component of the BVD (compIdx=0) or relates to the y component of the BVD (compIdx=1).

The value of intra_bc_abs_bvd_greater1_flag[compIdx] may specify whether the absolute value of a block vector component difference is greater than 1. When intra_bc_abs_bvd_greater1_flag [compIdx] is not present, it may be inferred to be equal to 0.

intra_bc_abs_bvd_minus2[compIdx] plus 2 may specify the absolute value of a block vector component difference.

intra_bc_bvd_sign_flag[compIdx] may specify the sign of a block vector component difference as follows. If intra_bc_bvd_sign_flag[compIdx] is equal to 0, the corresponding block vector component difference may have a positive value. Otherwise (intra_bc_bvd_sign_flag[compIdx] is equal to 1), the corresponding block vector component difference may have a negative value.

The value of HideSign indicates whether or not the sytnax element intra_bc_bvd_sign_flag is signaled. If HideSign is not true, intra_bc_bvd_sign_flag is signaled. If HideSign is true, intra_bc_bvd_sign_flag is not signalled, and instead, video decoder 30 infers the sign value. In the example above, only the sign value of the y component may be inferred. However, in other analagous examples, the sign value of the x component may be inferred.

In this example, the value of HideSign may be derived as follows

```
if(IsLeftCUIBC && IsAboveIBC) { uiBVPredType = 0; }
    else if(IsLeftCUIBC || IsAboveIBC) { uiBVPredType = 1; }
    else { uiBVPredType = 2; }
if(uiBVPredType)
    {
        if(uiBVPredType == 2)
            uiHideData  = ( (iMVPIdx==0) && (iHor >
                pcCU->getWidth(uiAbsPartIdx)) ||
((iMVPIdx==1) && (iHor > 0)) );
        else
            uiHideData  = ( (iMVPIdx==1) && (iHor >
                pcCU->getWidth(uiAbsPartIdx)));
    }
```

In the example above, HideSign may be equal to the value of uiHideData. As will be shown below, the value of uiHideData may also be used to conditionally signal the absolute value of a component of the BVD minus an offset.

The value of syntax element IsLeftCUIBC equal to 1 indicates that the CU to the left to the current block is coded as intraBC mode, and the value of IsLeftCUIBC equal to 0 indicates the CU left to the current block is not coded as intraBC mode.

The value of syntax element IsAboveIBC equal to 1 indicates the CU above to the current block is coded as intraBC mode, and the value of IsAboveIBC equal to 0 indicates the CU above to the current block is not coded as intraBC mode.

The value of syntax element iMVPIdx is the index of the intraBC merge candidate.

The value of syntax element uiBVPredType=2 indicates two default BVPs are being used for the current coding block. For example, the default BVPs may be (−2W,0) and (2W,0) or (−2W,0) and (−W,0). The value of syntax element uiBVPredType=1 indicates one default BVP is being used for coding the current block. For example, example the default BVP may be (−2W,0). The value of syntax element uiBVPredType=0 indicates no default vectors are being used for the current coding block. As can be seen from the example above, the intra_bc_bvd_sign_flag is only inferred (e.g., hidden) in the case that neither of the neighboring blocks are coded using intraBC mode (i.e., uiBVPredType is 1 or 2). In these examples, the default BVPs used are known by video decoder 30, and thus the value of intra_bc_bvd_sign_flag may be inferred given the presence of the example video coding characteristics shown above.

In the example above, when the value of uiBVPredType=0, both the neighboring blocks are present, and hence video encoder 20 will signal the sign value for both components (i.e., no sign hiding). When the value of uiBVPredType=1, at least of the neighboring blocks is not present. The predictor for this neighboring block is set to a default vector. If iMVPIdx points to this block/default vector (i.e., iMVPIdx==1) then uiHideData is set (i.e., video encoder 20 is configured to not signal the sign value). When the value of uiBVPredType=2, both of the neighboring blocks are not present. The predictors for these neighboring block are set to default vector. If iMVPIdx points to this block (i.e., iMVPIdx==0 or 1) then uiHideData is set (i.e., video encoder 20 is configured to not signal the sign value).

The following is an example implementation of the conditional signaling and inference of the absolute value of the vertical component (i.e., the y component) of the BVD minus an offset.

For the vertical component BVDy, the BVD 1Bvd[compIdx] for compIdx=1 is derived as follows:

lBvd[ compIdx ] = intra_bc_abs_bvd_greater0_flag [ 1 ] *
 ( intra_bc_abs_bvd_minus2 [ 1 ] + 2 ) *
( 1 − 2 * intra_bc_bvd_sign_flag [ 1 ] + uiHideData ? uiHeight : 0 )

where uiHeight is the height of the currently coded block.

As can be seen in the following example, to recover the absolute value of the y component of the BVD, video decoder 30 adds the height of the current block (uiHeight) back to the absolute value of the y component as indicated by the received syntax elements. Similarly, video encoder 20 may be configured to subtract uiHeight from the value of intra_bc_abs_bvd_minus2.

The following are some additional example implementations for conditionally signaling and/or inferring the sign value of portion of a component of a BVD. In the 18th JCT-VC meeting, the document Miyazawa, et al., "Non-SCCE1: Adaptive Switching between differential and direct coding for intra block copy vectors," Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014 (JCTVC-R0074) proposed to use (0, 0) as one of the predictors for Intra block vector coding. Location (0, 0) is equivalent to the upper left corner of the currently coded block, and as such, the use of (0, 0) indicate no prediction of the block vector. A flag was proposed to be added to specify whether the BV is predicted or not (i.e., predictor is zero or not). If not predicted, BV is coded without prediction. The flag was proposed to be signaled only when the BV component is non-zero.

Additionally, the document Karczewicz, e al., "Non-SCCE1: Block vector coding for Intra block copy," Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014 (JCTVC-R0181), proposed a binarization scheme for intra block vector coding. In this method, first a context coded flag is coded to indicate the BVD is zero. When the BVD is not zero, another flag is coded to indicate if absolute level of the BVD is greater than N. If the absolute value of the BVD is greater than N, the remaining absolute level is coded using bypass Exp-Golomb codes with order k. One flag is coded to indicate sign of the BVD.

Below, this disclosure describes an example implementation for intra BC BVD coding when the predictor for intra block vector coding happens to be (0, 0) and the binarization scheme of JCTVC-R0181 is used. Note that the following techniques may be generalized for any other binarization scheme or BVPs.

As described below, one aspect of the following example is to infer parts/components of the BVD, such as sign and offset, based on the unique geometry characteristics of intra BC coding. For example, the prediction happens from the spatial decoded samples within the current picture contrary to a temporal picture that is already fully decoded in the case of inter motion vector decoding.

TABLE 2

IntraBC Block vector difference syntax

| bvd_coding ( x0, y0, refList ) { | Descriptor |
|---|---|
| abs_bvd_greater0_flag[ 0 ] | ae(v) |
| abs_bvd_greater0_flag[ 1 ] | ae(v) |
| if( abs_bvd_greater0_flag[ 0 ] \|\| | |
| abs_bvd_greater0_flag[ 1 ] ) | |
|   bv_pred_flag | ae(v) |
| if(abs_bvd_greater0_flag[ 0 ] ) | |
|   abs_bvd_greater4_flag[ 0 ] | ae(v) |
| if(abs_bvd_greater0_flag[ 1 ] ) | |
|   abs_bvd_greater4_flag[ 1 ] | ae(v) |
| if(abs_bvd_greater0_flag[ 0 ] ) { | |
|   if(abs_bvd_greater4_flag[ 0 ] ) | |
|     abs_bvd_ minus5[ 0 ] | ae(v) |
|   else | |
|     abs_bvd_minus1[ 0 ] | ae(v) |
| if!(bv_pred_flag && abs_bvd_greater0_flag[ 1 ]==0)) | |
|   bvd_sign_flag[ 0 ] | ae(v) |
| } | |
| if(abs_bvd_greater0_flag[ 1 ] ) { | |
|   if(abs_bvd_greater4_flag[ 1 ] ) | |
|     abs_bvd_ minus5[ 1 ] | ae(v) |
|   else | |
|     abs_bvd_minus1[ 1 ] | ae(v) |
| if!(bv_pred_flag && abs_bvd_greater0_flag[ 0 ]>=0)) | |
|   bvd_sign_flag[ 1 ] | ae(v) |
| } | |
| } | |

The value of the syntax element bv_pred_flag specifies whether the block vector is predicted or not. When bv_pred_flag is equal to 1, the block vector is not predicted, else it is predicted. When bc_bv_pred_flag is not present, it is inferred to be equal to 0.

The value of the syntax element bvd_sign_flag[compIdx] specifies the sign of a block vector component difference as follows:

If bvd_sign_flag[compIdx] is equal to 0, the corresponding block vector component difference has a positive value.

Otherwise (bvd_sign_flag[compIdx] is equal to 1), the corresponding block vector component difference has a negative value.

When bvd_sign_flag[compIdx] is not present, it is inferred to be equal to 1.

The block vector difference 1Bvd [compIdx] for compIdx=0 . . . 1 is derived as follows:

lBvd [ compIdx ] = abs_bvd_greater0_flag [ compIdx ] * (
abs_bvd_greater4_flag? : (abs_bvd_minus5 [ compIdx ] + 5 ) : (
abs_bvd_minus1
[ compIdx ] + 1 ) ) * ( 1 − 2 * bvd_sign_flag [ compIdx ] );
  if(bv_pred_flag && abs_bvd_greater0_flag[ 1 ]>=0)
    lBvd [ 0 ] += uiWidth−1;
  if(bv_pred_flag && abs_bvd_greater0_flag[ 0 ]>=0))
    lBvd [ 1 ] += uiHeight−1;

where uiWidth and uiHeight are the width and height of the current PU.

As can be seen from the above example video decoder 30 may be configured to infer the second sign value of the y component of the BVD in the case that the BVD is predicted and an absolute value of the x component is greater than zero (i.e., !(bv_pred_flag&&abs_bvd_greater0_flag[0]>=0)). In another example, video decoder 30 may be configured to infer the second sign value of the x component of the BVD in the case that the BVD is predicted and an absolute value of the y component is greater than zero (i.e., !(bv_pred_flag&&abs_bvd_greater0_flag[1]==0)).

The following is another example proposed implementation for intra BC BVD coding. The following example implementation is based on proposals from C. Pang, et al., "Description of Core Experiment 1 (CE1): Vector entropy coding" Test 1.1 and Test 4.1, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014 (JCTVC-R1101 Test 4.1 and JCTVC-R1101 Test 1.1), and X. Guo, et al., "AHG8: Major-color-based screen content coding," Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013 (JCTVC-R0181).

One method consistent with methods described in JCTVC-R1101 test 4.1 (also detailed in the implementation above) proposes to code sign of both the block vector components (BVDx and BVDy) jointly using a truncated unary code when the block vector is not predicted.

For example, the following table shows example unary codes for coding the sign of BVDx and BVDy when the block vector is not predicted.

TABLE 3

BVD Unary Code Example 1

| BVDx's sign | BVDy's sign | Code |
|---|---|---|
| negative | negative | 1 |
| negative | positive | 00 |
| Positive | negative | 01 |

When the block vector is predicted, one method consistent with JCTVC-R1101 test 4.1 proposes to code sign of the both the block vector components (BVDx and BVDy) separately. That is, for each BVD component, if the sign of the BVD component is negative, a value of one is coded, else, if the sign of the BVD component is positive, a value of zero is coded.

TABLE 4

BVD Unary Code Example 2

| BVDx's sign | BVDy's sign | Code |
|---|---|---|
| negative | negative | 11 |
| negative | positive | 10 |
| Positive | negative | 01 |

The drawbacks of the above techniques may include:
a) The use of different binarization schemes for sign coding at the block level based on whether a BVD is predicted or not. This adds additional computational burden and complexity.
b) Inferring the value of the sign of a BVD component when a syntax element related to the sign is not present is also based on whether a BVD is predicted or not. This also adds to implementation complexity.

In view of these drawbacks, this disclosure proposes the following implementation. The techniques below are generally based on the techniques of the disclosure described above and may be used in conjunction with any other technique described in this disclosure.

One example implementation of the disclosure involves coding the sign of a BVD component separately for each BVD component whether or not the BVD is predicted. In another example, the sign of a BVD component is not inferred to be negative when a sign syntax element for any component is not present in the bitstream. The table below shows example syntax for this example implementation of the disclosure.

TABLE 5

IntraBC Block vector difference syntax

| bvd_coding ( x0, y0, refList ) { | Descriptor |
|---|---|
| abs_bvd_greater0_flag[ 0 ] | ae(v) |
| abs_bvd_greater0_flag[ 1 ] | ae(v) |
| if( abs_bvd_greater0_flag[ 0 ] \|\| | |
| abs_bvd_greater0_flag[ 1 ] ) | |
|   bv_pred_flag | ae(v) |
| if(abs_bvd_greater0_flag[ 0 ] ) | |
|   abs_bvd_greater4_flag[ 0 ] | ae(v) |
| if(abs_bvd_greater0_flag[ 1 ] ) | |
|   abs_bvd_greater4_flag[ 1 ] | ae(v) |
| if(abs_bvd_greater0_flag[ 0 ] ) { | |
|   if(abs_bvd_greater4_flag[ 0 ] ) | |
|     abs_bvd_ minus5[ 0 ] | ae(v) |
|   Else | |
|     abs_bvd_minus1[ 0 ] | ae(v) |
| if!((bv_pred_flag==0) && | |
| (abs_bvd_greater0_flag[ 1 ]==0))) | |
|   bvd_sign_flag[ 0 ] | ae(v) |
| } | |
| if(abs_bvd_greater0_flag[ 1 ] ) { | |
|   if(abs_bvd_greater4_flag[ 1 ] ) | |
|     abs_bvd_ minus5[ 1 ] | ae(v) |
|   Else | |
|     abs_bvd_minus1[ 1 ] | ae(v) |
| if!((bv_pred_flag==0) && (bvd_sign_flag[ 0 ] ==0 \|\| abs_bvd_greater0_flag[ 0 ] == 0)) | |
|   bvd_sign_flag[ 1 ] | ae(v) |
| } | |
| } | |

The value of syntax element bv_pred_flag specifies whether the block vector is predicted or not. When bv_pred_flag is equal to 0, the block vector is not predicted, else when bv_pred_flag is 1, the block vector is predicted. When bv_pred_flag is not present, it is inferred to be equal to 1.

The value of sytnax element bvd_sign_flag[compIdx] specifies the sign of a block vector component difference as follows:

If bvd_sign_flag[compIdx] is equal to 0, the corresponding block vector component difference has a positive value.

Otherwise (bvd_sign_flag[compIdx] is equal to 1), the corresponding block vector component difference has a negative value.

When bvd_sign_flag[compIdx] is not present, it is inferred to be equal to 1.

The block vector difference lBvdT [compIdx] for compIdx=0 . . . 1 is derived as follows:

lBvdT[compIdx]=abs_bvd_greater0_flag [compIdx]* (abs_bvd_greater4_flag?: (abs_bvd_minus5 [compIdx]+5):(abs_bvd_minus1 [compIdx]+1))*(1−2*bvd_sign_flag [compIdx]);

The block vector difference lBvd [compIdx] for compIdx=0 . . . 1 is derived as follows:

```
if((bv_pred_flag==0) && abs_bvd_greater0_flag[ 1 ]==1)
    lBvd [ 0 ] = lBvdT[ 0 ] + uiWidth−1;
if((bv_pred_flag==0) && lBvdT[ 0 ] >=0))
    lBvd [ 1 ] = lBvdT[ 1 ] + uiHeight−1;
``` where uiWidth and uiHeight are the width and height of the current PU.

In accordance with the above example, video decoder 30 may be configured to infer the second sign value for the second component (e.g., the sign value of the y component) in the case that a syntax element indicating the second sign value is not present in the encoded video bitstream.

FIG. 5 is a block diagram illustrating an example video encoder 20 that may implement the intra BC BVD coding techniques described in this disclosure. Video encoder 20 may perform intra and inter coding of video blocks within video slices. Intra coding relies on spatial prediction to reduce or remove spatial redundancy in video within a given video frame or picture. Inter coding relies on temporal prediction to reduce or remove temporal redundancy in video within adjacent frames or pictures of a video sequence. Intra mode (I mode) may refer to any of several spatial based compression modes.

In the example of FIG. 5, video encoder 20 includes video data memory 40, prediction processing unit 41, decoded picture buffer 64, summer 50, transform processing unit 52, quantization unit 54, and entropy encoding unit 56. Prediction processing unit 41 includes partition unit 35, motion estimation unit 42, motion compensation unit 44, intra BC unit 48, and intra prediction processing unit 46. For video block reconstruction, video encoder 20 also includes inverse quantization unit 58, inverse transform processing unit 60, and summer 62. An in-loop filter (not pictured) may be positioned between summer 62 and decoded picture buffer 64.

In various examples, a fixed or programmable hardware unit of video encoder 20 may be tasked to perform the techniques of this disclosure. Also, in some examples, the techniques of this disclosure may be divided among one or more of the illustrated fixed or programmable hardware units of video encoder 20 shown in FIG. 5, though other devices may also perform the techniques of this disclosure. For example, consistent with the example of FIG. 5, intra BC unit 48 of video encoder 20 may perform the techniques of this disclosure, alone, or in combination with other units of video encoder 20, such as motion estimation unit 42, motion compensation unit 44, intra prediction processing unit 46, and entropy encoding unit 56. In some examples, video encoder 20 may not include intra BC unit 48 and the functionality of intra BC unit 48 may be performed by other components of prediction processing unit 41, such as motion estimation unit 42 and/or motion compensation unit 44.

Video data memory 40 may store video data to be encoded by the components of video encoder 20. The video data stored in video data memory 40 may be obtained, for example, from video source 18. Decoded picture buffer (DPB) 64 is a buffer that stores reference video data for use in encoding video data by video encoder 20 (e.g., in intra or inter coding modes, also referred to as intra or inter prediction coding modes). Video data memory 40 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 40 and DPB 64 may be provided by the same memory device or separate memory devices. In various examples, video data memory 40 may be on-chip with other components of video encoder 20, or off-chip relative to those components.

As shown in FIG. 5, video encoder 20 receives video data, and partition unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may be configured to implement the techniques of this disclosure described above for encoding BVDs in intra BC mode. Prediction processing unit 41 may provide the resulting intra or inter coded block to summer 50 to generate residual block data and to summer 62 to reconstruct the encoded block for use as a reference picture.

Intra prediction processing unit 46 within prediction processing unit 41 may perform intra predictive coding of the current video block relative to one or more neighboring blocks in the same frame or slice as the current block to be coded to provide spatial compression. Motion estimation unit 42 and motion compensation unit 44 within prediction processing unit 41 perform inter predictive coding of the current video block relative to one or more predictive blocks in one or more reference pictures to provide temporal compression.

Motion estimation unit 42 may be configured to determine the inter prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture. Intra BC unit 48 may determine vectors, e.g., block vectors and BVDs, for Intra BC coding in a manner similar to the determination of motion vectors by motion estimation unit 42 for inter prediction, or may utilize motion estimation unit 42 to determine the block vector.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 64.

Motion estimation unit 42 sends the calculated motion vector to entropy encoding unit 56 and motion compensation unit 44.

In some examples, intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

Whether the predictive video block is from the same picture according to Intra BC prediction, or a different picture according to inter prediction, video encoder 20 may form a residual video block by subtracting pixel values of the predictive block from the pixel values of the current video block being coded, forming pixel difference values. The pixel difference values form residual data for the block, and may include both luma component differences and chroma component differences. Summer 50 represents the component or components that perform this subtraction operation. Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra prediction processing unit 46 may intra-predict a current block, as an alternative to the inter-prediction performed by motion estimation unit 42 and motion compensation unit 44, or the Intra BC prediction performed by intra BC unit 48, as described above. In particular, intra prediction processing unit 46 may determine an intra prediction mode, including an Intra BC mode, to use to encode a current block. In some examples, intra prediction processing unit 46 may encode a current block using various intra prediction modes, e.g., during separate encoding passes, and intra prediction processing unit 46 (or a mode select unit, in some examples) may select an appropriate intra prediction mode to use from the tested modes.

For example, intra prediction processing unit 46 may calculate rate-distortion values using a rate-distortion analysis for the various tested intra prediction modes, and select the intra prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra prediction processing unit 46 may calculate ratios from the distortions and rates for the various encoded blocks to determine which intra prediction mode exhibits the best rate-distortion value for the block.

In any case, after selecting an intra prediction mode for a block, intra prediction processing unit 46 may provide information indicative of the selected intra prediction mode for the block to entropy encoding unit 56. Entropy encoding unit 56 may encode the information indicating the selected intra prediction mode in accordance with the techniques of this disclosure. Video encoder 20 may include in the transmitted bitstream configuration data, which may include a plurality of intra prediction mode index tables and a plurality of modified intra prediction mode index tables (also referred to as codeword mapping tables), definitions of encoding contexts for various blocks, and indications of a most probable intra prediction mode, an intra prediction mode index table, and a modified intra prediction mode index table to use for each of the contexts.

After prediction processing unit 41 generates the predictive block for the current video block via either inter prediction or intra prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block for prediction of other video blocks. Motion compensation unit 44 and/or intra BC unit 48 may calculate a reference block by adding the residual block to a predictive block of one of the reference pictures within one of the reference picture lists. Motion compensation unit 44 and/or intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 to produce a reference block for storage in decoded picture buffer 64. The reference block may be used by intra BC unit 48, motion estimation unit 42 and motion compensation unit 44 as a reference block to inter predict a block in a subsequent video frame or picture.

FIG. 6 is a block diagram illustrating an example video decoder 30 that may implement the techniques for coding BVDs in intra BC mode described in this disclosure. In the example of FIG. 6, video decoder 30 includes video data memory 79, entropy decoding unit 80, prediction processing unit 81, inverse quantization unit 86, inverse transformation processing unit 88, summer 90, and decoded picture buffer 92. Prediction processing unit 81 includes intra BC unit 85, motion compensation unit 82 and intra prediction processing unit 84. Video decoder 30 may, in some examples, perform a decoding pass generally reciprocal to the encoding pass described with respect to video encoder 20 from FIG. 5.

In various examples, a unit of video decoder 30 may be tasked to perform the techniques of this disclosure. Also, in some examples, the techniques of this disclosure may be divided among one or more of the units of video decoder 30. For example, intra BC unit 85 may perform the techniques of this disclosure, alone, or in combination with other units of video decoder 30, such as motion compensation unit 82, intra prediction processing unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the components of video decoder 30. The video data stored in video data memory 79 may be obtained, for example, from storage device 32, from a local video source, such as a camera, via wired or wireless network communication of video data, or by accessing physical data storage media. Video data memory 79 may form a coded picture buffer (CPB) that stores encoded video data from an encoded video bitstream. Decoded picture buffer 92 is one example of a decoded picture buffer (DPB) that stores reference video data for use in decoding video data by video decoder 30 (e.g., in intra or inter coding modes, also referred to as intra or inter prediction coding modes). Video data memory 79 and DPB 92 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 79 and DPB 92 may be provided by the same memory device or separate memory devices. In various examples, video data memory 79 may be on-chip with other components of video decoder 30, or off-chip relative to those components.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra coded (I) slice, intra prediction processing unit 84 of prediction processing unit 81 may generate prediction data for a video block of the current video slice based on a signaled intra prediction mode and data from previously decoded blocks of the current frame or picture. Prediction processing unit 81 may be configured to implement the techniques of this disclosure for coding BVDs in intra BC coding mode. When the video frame is coded as an inter coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in decoded picture buffer 92.

In other examples, when the video block is coded according to the Intra BC mode described herein, intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from DPB 92.

Motion compensation unit 82 and/or intra BC unit 85 may determine prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra or inter prediction) used to code the video blocks of the video slice, an inter prediction slice type (e.g., B slice or P slice), construction information for one or more of the reference picture lists for the slice, motion vectors for each inter encoded video block of the slice, inter prediction status for each inter coded video block of the slice, and other information to decode the video blocks in the current video slice.

Similarly, intra BC unit 85 may use some of the received syntax elements, e.g., a flag, to determine that the current video block was predicted using the Intra BC mode, construction information indicating which video blocks of the picture are within the reconstructed region and should be stored in DPB 92, block vectors for each Intra BC predicted video block of the slice, Intra BC prediction status for each Intra BC predicted video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and intra BC unit 85. Summer 90 represents the component or components that perform this summation operation to produce reconstructed video blocks.

Summer 90 represents the component or components that perform this summation operation. An in-loop filter (not pictured) may be positioned between summer 90 and decoded picture buffer 92. The decoded video blocks in a given frame or picture are then stored in decoded picture buffer 92, which stores reference pictures used for subsequent motion compensation. Decoded picture buffer 92 also stores decoded video for later presentation on a display device, such as display device 34 of FIG. 1.

Figure 7:
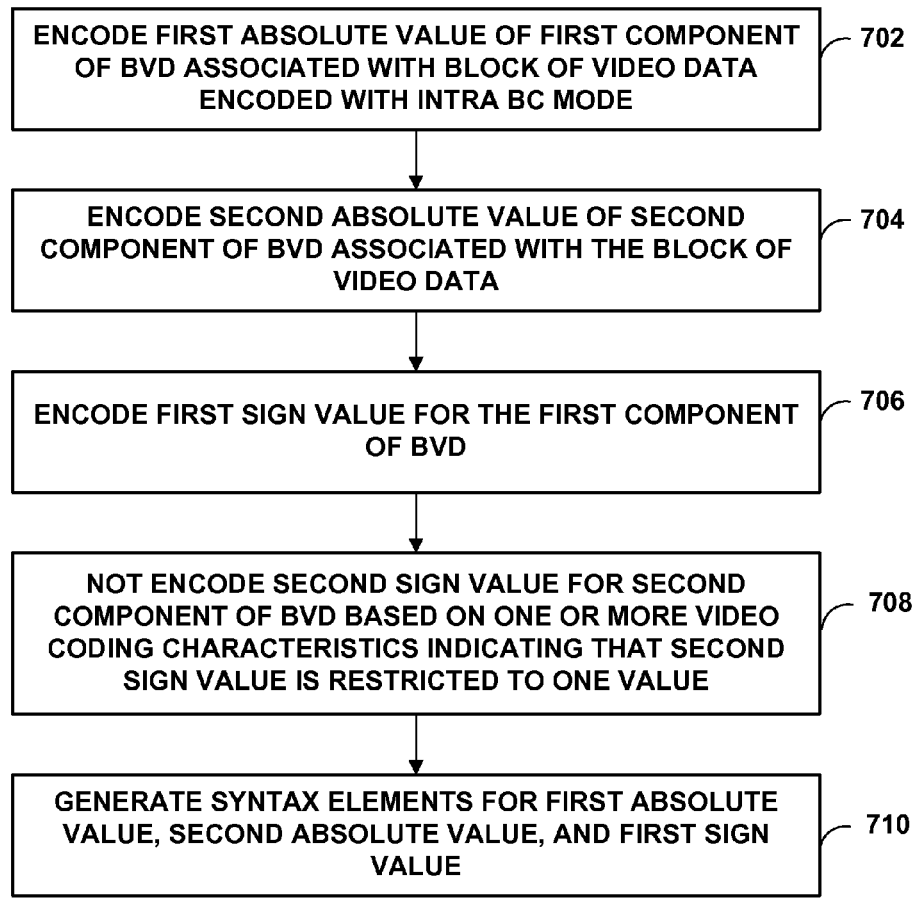
FIG. 7 is a flowchart illustrating an example encoding method of the disclosure.

FIG. 7 is a flowchart illustrating an example encoding method of the disclosure. The techniques of FIG. 7 may be implemented by one or more hardware units of video encoder 20, including intra BC unit 48.

In one example of the disclosure, intra BC unit 48 may be configured to encode a first absolute value of a first component of a BVD associated with a block of video data encoded with intra BC mode (702) and encode a second absolute value of a second component of the associated with the block of video data (704). Intra BC unit may be further configured to encode a first sign value for the first component of the BVD (706), and not encode a second sign value for the second component of the BVD based on one or more video coding characteristics indicating that the second sign value is restricted to one value (708). Intra BC unit 48 may be further configured to generate syntax elements for the first absolute value, the second absolute value, and the first sign value (710).

In one example of the disclosure, the one or more video coding characteristics include one or more of the first sign value of the first component of the BVD, use of default block vector predictors, a value of the block vector predictor, a position of the block vector predictor, an availability of a neighboring block to the encoded block, a coding mode of the neighboring block, or an intra BC merge index.

In another example of the disclosure, to encode the first absolute value of the first component of the BVD, intra BC unit 48 may be further configured to subtract an offset from the first absolute value based on the one or more video coding characteristics indicating that the first absolute value of the first component is greater than the offset. In one example, the offset is one of a width of the block of video data or a height of the block of video data.

Figure 8:
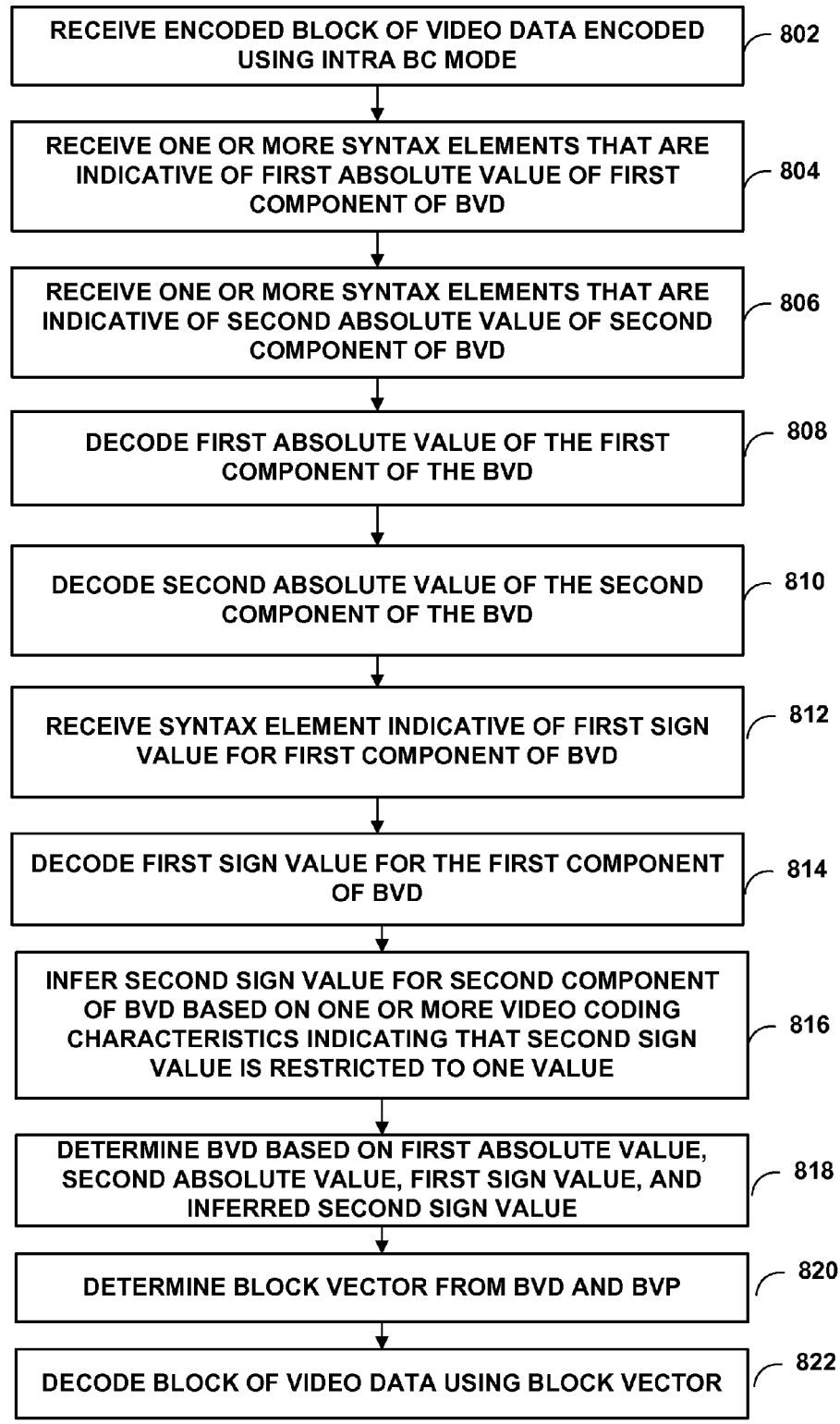
FIG. 8 is a flowchart illustrating an example decoding method of the disclosure.

FIG. 8 is a flowchart illustrating an example decoding method of the disclosure. The techniques of FIG. 8 may be implemented by one or more hardware units of video decoder 30, including intra BC unit 85.

In one example of the disclosure, video decoder 30 may be configured to receive, in an encoded video bitstream, an encoded block of the video data encoded using an intra BC mode (802). Intra BC unit 85 may be configured to also receive one or more syntax elements that are indicative of a first absolute value of a first component of a BVD (804) and receive one or more syntax elements that are indicative of a second absolute value of a second component of a BVD (806). Intra BC unit 85 may be configured to decode the first absolute value of the first component of the BVD associated with the encoded block of video data (808) and decode a second absolute value of the second component of the associated with the encoded block of video data (810).

Intra BC unit 85 may be further configured to receive a syntax element indicative of a first sign value for the first component of the BVD (812) and decode the first sign value for the first component of the BVD (814). In accordance with the techniques of this disclosure, intra BC unit 85 may be configured to infer a second sign value for the second component of the BVD based on one or more video coding characteristics indicating that the second sign value is restricted to one value (816). That is, rather than receiving a syntax value for the sign value of the second component of the BVD (i.e., video encoder 20 does not encode a syntax element indicating the sign value of the second component), intra BC unit 85 infers the sign value of the second component.

Intra BC unit 85 may be further configured to determine the BVD based on the decoded first absolute value of the first component of the BVD, the decoded second absolute value of the second component of the BVD, the decoded first sign value for the first component of the BVD, and the inferred second sign value for the second component of the BVD (818). Intra BC unit 85 may then determine a block vector from the BVD and a block vector predictor (820), and decode the block of video data using the block vector (822).

In the examples above, the one or more video coding characteristics may include one or more of the first sign value of the first component of the BVD, use of default block vector predictors, a value of the block vector predictor, a position of the block vector predictor, an availability of a neighboring block to the encoded block, a coding mode of the neighboring block, or an intra BC merge index.

In one example, the first component of the BVD is the x component of the BVD, and the second component of the BVD is the y component of the BVD. In another example, the first component of the BVD is the y component of the BVD, and the second component of the BVD is the x component of the BVD.

In another example of the disclosure, intra BC unit 85 may be configured to infer the second sign value of the y component of the BVD in the case that the BVD is predicted and an absolute value of the x component is greater than zero (i.e., !(bv_pred_flag&&abs_bvd_greater0_flag[0]>=0)). In another example, intra BC unit 85 may be configured to infer the second sign value of the x component of the BVD in the case that the BVD is predicted and an absolute value of the y component is greater than zero (i.e., !(bv_red_flag&&abs_bvd_greater0_flag[1]==0)).

In another example of the disclosure, intra BC unit 85 may be configured to infer the second sign value for the second component (e.g., the sign value of the y component) in the case that a syntax element indicating the second sign value is not present in the encoded video bitstream.

Figure 9:
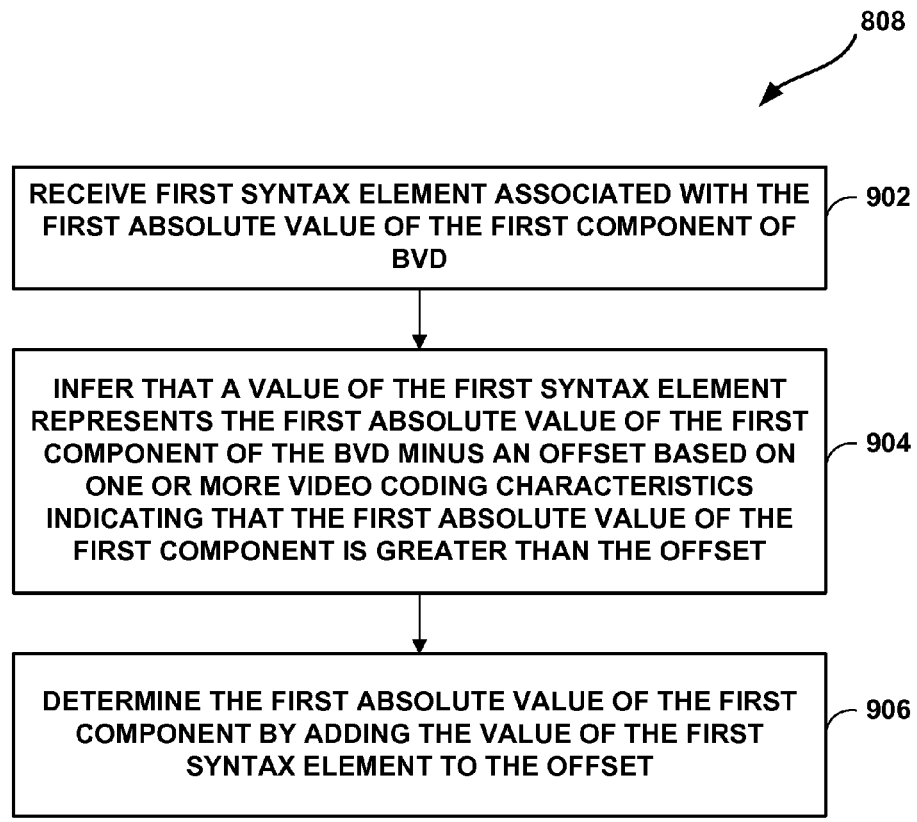
FIG. 9 is a flowchart illustrating another example decoding method of the disclosure.

FIG. 9 is a flowchart illustrating another example decoding method of the disclosure. The techniques of FIG. 9 may be implemented by one or more hardware units of video decoder 30, including intra BC unit 85.

In one example of the disclosure to decode the first absolute value of the first component of the BVD (see 808 of FIG. 8), intra BC unit 85 is configured to receive a first syntax element associated with the first absolute value of the first component of the BVD (902), and infer that a value of the first syntax element represents the first absolute value of the first component of the BVD minus an offset based on the one or more video coding characteristics indicating that the first absolute value of the first component is greater than the offset (904). Intra BC unit 85 may determine the first absolute value of the first component by adding the value of the first syntax element to the offset (906). In one example, the offset is one of a width of the encoded block of video data or a height of the encoded block of video data. In another example, the offset is a function of a width of the encoded block of video data or a function of a height of the encoded block of video data.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
receiving, in an encoded video bitstream, an encoded block of video data encoded using an intra Block Copy (BC) mode;
decoding a first absolute value of a first component of a block vector difference (BVD) associated with the encoded block of video data;
decoding a second absolute value of a second component of the BVD associated with the encoded block of video data;
decoding a first sign value for the first component of the BVD;
inferring a second sign value for the second component of the BVD based on one or more video coding characteristics indicating that the second sign value is restricted to one value, the one or more video coding characteristics being associated with a location of the block of video data;
determining the BVD based on the decoded first absolute value of the first component of the BVD, the decoded second absolute value of the second component of the BVD, the decoded first sign value for the first component of the BVD, and the inferred second sign value for the second component of the BVD;
determining a block vector from the BVD and a block vector predictor; and
decoding the block of video data using the block vector.

2. The method of claim 1, wherein the one or more video coding characteristics include one or more of the first sign value of the first component of the BVD, use of default block vector predictors, a value of a block vector predictor, a position of the block vector predictor, an availability of a neighboring block to the encoded block, a coding mode of the neighboring block, or an intra BC merge index.

3. The method of claim 1, wherein the first component of the BVD is the x component of the BVD, and wherein the second component of the BVD is the y component of the BVD.

4. The method of claim 3, wherein inferring the second sign value for the second component comprises inferring the second sign value of the y component of the BVD in the case that the BVD is predicted and an absolute value of the x component is greater than zero.

5. The method of claim 1, wherein the first component of the BVD is the y component of the BVD, and wherein the second component of the BVD is the x component of the BVD.

6. The method of claim 5, wherein inferring the second sign value for the second component comprises inferring the second sign value of the x component of the BVD in the case that the BVD is predicted and an absolute value of the y component is greater than zero.

7. The method of claim 1, wherein decoding the first absolute value of the first component of the BVD comprises:
receiving a first syntax element associated with the first absolute value of the first component of the BVD;
inferring that a value of the first syntax element represents the first absolute value of the first component of the BVD minus an offset based on the one or more video coding characteristics indicating that the first absolute value of the first component is greater than the offset; and
determining the first absolute value of the first component by adding the value of the first syntax element to the offset.

8. The method of claim 7, wherein the offset is one of a width of the encoded block of video data or a height of the encoded block of video data.

9. The method of claim 7, wherein the offset is a function of a width of the encoded block of video data or a function of a height of the encoded block of video data.

10. The method of claim 1, wherein inferring the second sign value for the second component comprises inferring the second sign value for the second component in the case that a syntax element indicating the second sign value is not present in the encoded video bitstream.

11. An apparatus configured to decode video data, the apparatus comprising:
a memory configured to store video data; and
a video decoder configured to:
receive, in an encoded video bitstream, an encoded block of the video data encoded using an intra Block Copy (BC) mode;
decode a first absolute value of a first component of a block vector difference (BVD) associated with the encoded block of video data;
decode a second absolute value of a second component of the BVD associated with the encoded block of video data;
decode a first sign value for the first component of the BVD;
infer a second sign value for the second component of the BVD based on one or more video coding characteristics indicating that the second sign value is restricted to one value, the one or more video coding characteristics being associated with a location of the block of video data;
determine the BVD based on the decoded first absolute value of the first component of the BVD, the decoded second absolute value of the second component of the BVD, the decoded first sign value for the first component of the BVD, and the inferred second sign value for the second component of the BVD;
determine a block vector from the BVD and a block vector predictor; and
decode the block of video data using the block vector.

12. The apparatus of claim 11, wherein the one or more video coding characteristics include one or more of the first sign value of the first component of the BVD, use of default block vector predictors, a value of a block vector predictor, a position of the block vector predictor, an availability of a neighboring block to the encoded block, a coding mode of the neighboring block, or an intra BC merge index.

13. The apparatus of claim 11, wherein the first component of the BVD is the x component of the BVD, and wherein the second component of the BVD is the y component of the BVD.

14. The apparatus of claim 13, wherein to infer the second sign value for the second component, the video decoder is configured to infer the second sign value of the y component of the BVD in the case that the BVD is predicted and an absolute value of the x component is greater than zero.

15. The apparatus of claim 11, wherein the first component of the BVD is the y component of the BVD, and wherein the second component of the BVD is the x component of the BVD.

16. The apparatus of claim 15, wherein to infer the second sign value for the second component, the video decoder is configured to infer the second sign value of the x component of the BVD in the case that the BVD is predicted and an absolute value of the y component is greater than zero.

17. The apparatus of claim 11, wherein to decode the first absolute value of the first component of the BVD, the video decoder is configured to:
receive a first syntax element associated with the first absolute value of the first component of the BVD;
infer that a value of the first syntax element represents the first absolute value of the first component of the BVD minus an offset based on the one or more video coding characteristics indicating that the first absolute value of the first component is greater than the offset; and
determine the first absolute value of the first component by adding the value of the first syntax element to the offset.

18. The apparatus of claim 17, wherein the offset is one of a width of the encoded block of video data or a height of the encoded block of video data.

19. The apparatus of claim 17, wherein the offset is a function of a width of the encoded block of video data or a function of a height of the encoded block of video data.

20. The apparatus of claim 11, wherein to infer the second sign value for the second component, the video decoder is configured to infer the second sign value for the second component in the case that a syntax element indicating the second sign value is not present in the encoded video bitstream.

21. The apparatus of claim 11, wherein the video decoder is implemented in a processor, and wherein the apparatus is a wireless communication device, the wireless communication device further comprising:
a receiver configured to receive the video data.

22. The apparatus of claim 21, wherein the wireless communication device is a cellular telephone, and wherein the receiver is configured to receive the video data and demodulate the received video data according to a cellular communication standard.

23. A method of encoding video data, the method comprising:
- encoding a first absolute value of a first component of a block vector difference (BVD) associated with a block of video data encoded with intra Block Copy (BC) mode;
- encoding a second absolute value of a second component of the BVD associated with the block of video data;
- encoding a first sign value for the first component of the BVD;
- not encoding a second sign value for the second component of the BVD based on one or more video coding characteristics indicating that the second sign value is restricted to one value, the one or more video coding characteristics being associated with a location of the block of video data; and
- generating syntax elements for the first absolute value, the second absolute value, and the first sign value.

24. The method of claim 23, wherein the one or more video coding characteristics include one or more of the first sign value of the first component of the BVD, use of default block vector predictors, a value of a block vector predictor, a position of the block vector predictor, an availability of a neighboring block to the encoded block, a coding mode of the neighboring block, or an intra BC merge index.

25. The method of claim 23, wherein encoding the first absolute value of the first component of the BVD comprises:
- subtracting an offset from the first absolute value based on the one or more video coding characteristics indicating that the first absolute value of the first component is greater than the offset.

26. The method of claim 25, wherein the offset is one of a width of the block of video data or a height of the block of video data.

27. An apparatus configured to encode video data, the apparatus comprising:
- a memory configured to store video data; and
- a video encoder configured to:
  - encode a first absolute value of a first component of a block vector difference (BVD) associated with a block of the video data encoded with intra Block Copy (BC) mode;
  - encode a second absolute value of a second component of the BVD associated with the block of the video data;
  - encode a first sign value for the first component of the BVD;
  - not encode a second sign value for the second component of the BVD based on one or more video coding characteristics indicating that the second sign value is restricted to one value, the one or more video coding characteristics being associated with a location of the block of the video data; and
  - generate syntax elements for the first absolute value, the second absolute value, and the first sign value.

28. The apparatus of claim 27, wherein the one or more video coding characteristics include one or more of the first sign value of the first component of the BVD, use of default block vector predictors, a value of a block vector predictor, a position of the block vector predictor, an availability of a neighboring block to the encoded block, a coding mode of the neighboring block, or an intra BC merge index.

29. The apparatus of claim 27, wherein the video encoder is implemented in a processor, and wherein the apparatus is a wireless communication device, the wireless communication device further comprising:
- a transmitter configured to transmit the syntax elements.

30. The apparatus of claim 29, wherein the wireless communication device is a cellular telephone, and wherein the transmitter is configured to modulate and transmit the syntax elements according to a cellular communication standard.

* * * * *